US010555362B2

(12) United States Patent
Quan et al.

(10) Patent No.: US 10,555,362 B2
(45) Date of Patent: Feb. 4, 2020

(54) RADIO BEARER RECONFIGURATION METHOD, RADIO BEARER ESTABLISHMENT METHOD, USER EQUIPMENT, AND BASE STATION

(71) Applicant: Huawei Technologies Co., Ltd., Shenzhen, Guangdong (CN)

(72) Inventors: Wei Quan, Beijing (CN); Bingzhao Li, Beijing (CN); Xiaodong Yang, Shenzhen (CN); Zhenxing Hu, Shenzhen (CN); Jinhua Miao, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 15/664,257

(22) Filed: Jul. 31, 2017

(65) Prior Publication Data
US 2017/0353992 A1 Dec. 7, 2017

Related U.S. Application Data

(63) Continuation of application No. PCT/CN2015/071863, filed on Jan. 29, 2015.

(51) Int. Cl.
*H04W 76/20* (2018.01)
*H04W 76/10* (2018.01)
*H04W 76/30* (2018.01)

(52) U.S. Cl.
CPC .......... *H04W 76/20* (2018.02); *H04W 76/10* (2018.02); *H04W 76/30* (2018.02)

(58) Field of Classification Search
CPC ..... H04W 36/06; H04W 76/10; H04W 76/11; H04W 76/12; H04W 76/15; H04W 76/19; H04W 76/20; H04W 76/27
See application file for complete search history.

(56) References Cited

U.S. PATENT DOCUMENTS 8,274,900 B2 * 9/2012 Yi ................ H04L 1/1829
370/242
8,553,566 B2 * 10/2013 Yi ................ H04L 1/1829
370/242
(Continued)

FOREIGN PATENT DOCUMENTS

CN 102457970 A * 5/2012
CN 102457970 A 5/2012
(Continued)

OTHER PUBLICATIONS

3GPP TS 36.322 V12.1.1 (Dec. 2014), 3rd Generation Partnership Project; Technical Specification Group Radio Access Network; Evolved Universal Terrestrial Radio Access (E-UTRA); Radio Link Control (RLC) protocol specification (Release 12), 40 pages.
(Continued)

*Primary Examiner* — Eric Nowlin
(74) *Attorney, Agent, or Firm* — Leydig, Voit & Mayer, Ltd.

(57) ABSTRACT

Embodiments of the present disclosure relate to the field of communications technologies, and provide a radio bearer reconfiguration method, a radio bearer establishment method, user equipment, and a base station. The method includes receiving, by a UE, a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured; releasing, by the UE, the target radio bearer; and transmitting, by the UE, signaling and/or data on the corresponding target radio bearer according to the target configuration parameter.

26 Claims, 10 Drawing Sheets

(56) References Cited

U.S. PATENT DOCUMENTS

| | | | |
|---|---|---|---|
| 9,119,190 B2 * | 8/2015 | Kanamarlapudi | .......................... H04W 72/0406 |
| 9,312,992 B2 * | 4/2016 | Wang | ................... H04L 1/1867 |
| 9,313,820 B2 * | 4/2016 | Zhang | ............... H04W 36/0055 |
| 9,629,036 B2 * | 4/2017 | Kim | ...................... H04L 1/1841 |
| 9,713,044 B2 * | 7/2017 | Yamada | ............ H04W 36/0072 |
| 10,051,679 B2 * | 8/2018 | Yi | ..................... H04W 72/1215 |
| 2003/0210714 A1 * | 11/2003 | Wu | ........................ H04W 28/06 370/503 |
| 2009/0318127 A1 * | 12/2009 | Yi | ......................... H04L 1/1829 455/422.1 |
| 2011/0176993 A1 * | 7/2011 | Schneider | ............ C12Q 1/6883 424/1.11 |
| 2011/0228746 A1 * | 9/2011 | Chun | .................... H04W 28/06 370/331 |
| 2011/0249575 A1 * | 10/2011 | Dwyer | ................. H04W 76/27 370/252 |
| 2012/0020278 A1 * | 1/2012 | Moberg | ................. H04B 7/155 370/315 |
| 2013/0010688 A1 * | 1/2013 | Yi | ......................... H04L 1/1829 370/328 |
| 2013/0165124 A1 | 6/2013 | Liang et al. | |
| 2014/0022978 A1 * | 1/2014 | Chen | .................... H04W 76/27 370/312 |
| 2014/0036798 A1 * | 2/2014 | Kanamarlapudi | .......................... H04W 72/0406 370/329 |
| 2014/0213221 A1 | 7/2014 | Chai et al. | |
| 2015/0094073 A1 * | 4/2015 | Peng | ................. H04W 72/0406 455/450 |
| 2015/0140999 A1 * | 5/2015 | Zhang | ............... H04W 36/0055 455/424 |
| 2015/0222397 A1 * | 8/2015 | Wang | ................... H04L 1/1867 370/329 |
| 2015/0230107 A1 * | 8/2015 | Chiba | ................. H04W 24/04 370/225 |
| 2015/0304896 A1 * | 10/2015 | Turtinen | ............... H04W 76/14 370/331 |
| 2016/0192247 A1 * | 6/2016 | Zhang | ............... H04W 36/0055 455/425 |
| 2016/0255675 A1 * | 9/2016 | Van Lieshout | ....... H04L 1/1829 370/329 |
| 2017/0353992 A1 * | 12/2017 | Quan | .................... H04W 76/20 |
| 2018/0376332 A1 * | 12/2018 | Basu Mallick | ....... H04W 76/19 |
| 2019/0098512 A1 * | 3/2019 | Yi | ......................... H04W 24/02 |
| 2019/0261450 A1 * | 8/2019 | Adachi | ................. H04W 76/11 |

FOREIGN PATENT DOCUMENTS

| | | | | |
|---|---|---|---|---|
| CN | 102783242 A | * | 11/2012 | ............ H04W 76/27 |
| CN | 102783242 A | | 11/2012 | |
| JP | 2013524585 A | | 6/2013 | |
| JP | 2014531840 A | | 11/2014 | |
| WO | 9939528 A1 | | 8/1999 | |
| WO | WO-2011060998 A1 | * | 5/2011 | ............ H04W 76/27 |
| WO | WO-2012129983 A1 | * | 10/2012 | .......... H04W 72/085 |
| WO | 2014019131 A1 | | 2/2014 | |
| WO | WO-2016119183 A1 | * | 8/2016 | ............ H04W 76/20 |

OTHER PUBLICATIONS

3GPP TS 36.323 V12.2.0 (Dec. 2014), 3rd Generation Partnership Project; Technical Specification Group Radio Access Network; Evolved Universal Terrestrial Radio Access (E-UTRA); Packet Data Convergence Protocol (PDCP) specification (Release 12), 30 pages.

NEC; "Switching of MBMS broadcast TV channel transmitted PtP"; 3GPP TSG RAN WG2 Meeting #56bis; R2-070334, Sorrento, Italy; Jan. 15-19, 2007; 3 pages.

NEC; "RB setup with pre-configuration"; 3GPP TSG-RAN WG2 #60; R2-075040; Jeju, Korea; Nov. 4-8, 2007; 6 pages.

3GPP TS 36.331 V12.4.1 (Dec. 2014), 3rd Generation Partnership Project; Technical Specification Group Radio Access Network; Evolved Universal Terrestrial Radio Access (E-UTRA); Radio Resource Control (RRC); Protocol specification (Release 12), 410 pages.

* cited by examiner

RADIO BEARER RECONFIGURATION METHOD, RADIO BEARER ESTABLISHMENT METHOD, USER EQUIPMENT, AND BASE STATION

CROSS-REFERENCE TO RELATED APPLICATION

This application is a continuation of International Application No. PCT/CN2015/071863, filed on Jan. 29, 2015, the disclosure of which is hereby incorporated by reference in its entirety.

TECHNICAL FIELD

The present disclosure relates to the field of communications technologies, and in particular, to a radio bearer reconfiguration method, a radio bearer establishment method, user equipment, and a base station.

BACKGROUND

A radio resource control (English: Radio Resource Control; RRC for short) connection is a connection established between user equipment (English: User Equipment; UE for short) and abase station. The RRC connection is used to transmit signaling and data between the UE and the base station.

According to a regulation in an RRC protocol, at least one radio bearer (English: Radio Bearer; RB for short) may be established between UE and a base station. Each RB may be at least one of a first signaling radio bearer (English: Signaling Radio Bearer; SRB for short; denoted as an SRB1), a second signaling radio bearer (denoted as an SRB2), or a data radio bearer (English: Data Radio Bearer; DRB for short). The SRB1 and the SRB2 are used to implement a function of signaling transmission, and the DRB is used to implement a function of data transmission. Because of a factor such as that a condition of a radio channel is changed, a service feature is changed or a quality of service (English: Quality of Service; QoS for short) requirement of a service is changed, an RB that is established between the UE and the base station may need to be reconfigured, that is, a configuration parameter corresponding to the RB may need to be reconfigured. The base station reconfigures an RB by using a Full Config (full configuration) manner. Specifically, for example, four RBs, that is, the SRB1, a DRB1, a DRB2, and a DRB3 are established between the UE and the base station. If the DRB1 needs to be reconfigured, the base station generates an RRC connection reconfiguration message, and sends the RRC connection reconfiguration message to the UE. The RRC connection reconfiguration message carries four radio bearer identifiers and four groups of configuration parameters. Each RB corresponds to one radio bearer identifier and one group of configuration parameters.

In a process of implementing the present disclosure, the inventor finds that the foregoing technology has at least the following problems: When RBs established between UE and a base station are reconfigured by using a Full Config manner, an RRC connection reconfiguration message sent by the base station to the UE not only carries a reconfigured configuration parameter corresponding to an RB that needs to be reconfigured, but also carries an original configuration parameter corresponding to an RB that does not need to be reconfigured. As a result, excessive signaling resources need to be used between the UE and the base station.

SUMMARY

To resolve a problem of using excessive signaling resources during reconfiguration of an RB established between UE and a base station in the foregoing technology, embodiments of the present disclosure provide a radio bearer reconfiguration method, a radio bearer establishment method, user equipment, and a base station. The technical solutions are as follows:

A first aspect provides a radio bearer reconfiguration method, where the method includes:

receiving, by user equipment UE, a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured;

releasing, by the UE, the target radio bearer; and transmitting, by the UE, signaling and/or data on the corresponding target radio bearer according to the target configuration parameter.

In a first possible implementation manner of the first aspect, the radio bearer reconfiguration indication further includes a full configuration identifier; and the releasing, by the UE, the target radio bearer includes:

releasing, by the UE, the target radio bearer according to the full configuration identifier.

With reference to the first aspect or the first possible implementation manner of the first aspect, in a second possible implementation manner of the first aspect, the releasing, by the UE, the target radio bearer includes:

clearing, by the UE from an original configuration parameter corresponding to the target radio bearer by releasing a protocol entity of the target radio bearer, an original configuration parameter corresponding to the target configuration parameter, where the protocol entity includes a packet data convergence protocol PDCP layer entity and/or a radio link control RLC layer entity.

With reference to the second possible implementation manner of the first aspect, in a third possible implementation manner of the first aspect, the clearing, by the UE from an original configuration parameter corresponding to the target radio bearer by releasing a protocol entity of the target radio bearer, an original configuration parameter corresponding to the target configuration parameter includes:

if the target configuration parameter is configuration parameters of all items corresponding to the target radio bearer, clearing, by the UE, original configuration parameters of all the items corresponding to the target radio bearer; or if the target configuration parameter is configuration parameters of some items corresponding to the target radio bearer, clearing, by the UE from the original configuration parameter corresponding to the target radio bearer, original configuration parameters of some items corresponding to the target configuration parameter, and reserving original configuration parameters of some other unchanged items.

With reference to the first aspect, the first possible implementation manner of the first aspect, the second possible implementation manner of the first aspect or the third possible implementation manner of the first aspect, in a fourth possible implementation manner of the first aspect, before the releasing, by the UE, the target radio bearer, the method further includes:

reestablishing, by the UE, a protocol entity of the target radio bearer, to process a data packet that is temporarily not completely processed, where the protocol entity includes the PDCP layer entity and/or the RLC layer entity.

With reference to the fourth possible implementation manner of the first aspect, in a fifth possible implementation manner of the first aspect, the reestablishing, by the UE, a protocol entity of the target radio bearer, to process a data packet that is temporarily not completely processed includes:

delivering, by the UE by using the PDCP layer entity of the target radio bearer to an upper-layer entity of a PDCP layer, a data packet that meets a first predetermined condition, where the data packet that meets the first predetermined condition refers to data packets that are temporarily not delivered to the upper-layer entity by the PDCP layer entity and that have consecutive data packet sequence numbers; and/or delivering, by the UE by using the RLC layer entity of the target radio bearer to the PDCP layer entity, a data packet that meets a second predetermined condition, where the data packet that meets the second predetermined condition refers to a data packet that is temporarily not delivered to the PDCP layer entity by the RLC layer entity and that may be reassembled by the RLC layer entity.

With reference to the fourth possible implementation manner of the first aspect or the fifth possible implementation manner of the first aspect, in a sixth possible implementation manner of the first aspect, the reestablishing, by the UE, a protocol entity of the target radio bearer includes:

reestablishing, by the UE, the protocol entity of the target radio bearer according to the full configuration identifier in the radio bearer reconfiguration indication; or, the radio bearer reconfiguration indication further includes a reestablishment identifier, reestablishing, by the UE, the protocol entity of the target radio bearer according to the reestablishment identifier.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect or the sixth possible implementation manner of the first aspect, in a seventh possible implementation manner of the first aspect, the transmitting, by the UE, signaling and/or data on the corresponding target radio bearer according to the target configuration parameter includes:

if the target configuration parameter is configuration parameters of all items corresponding to the target radio bearer, transmitting, by the UE, signaling and/or data on the corresponding target radio bearer according to the target configuration parameter; or if the target configuration parameter is configuration parameters of some items corresponding to the target radio bearer, transmitting, by the UE, signaling and/or data on the corresponding target radio bearer according to the target configuration parameter and original configuration parameters of some other unchanged items corresponding to the target radio bearer.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner of the first aspect, the radio bearer reconfiguration indication is a radio resource control RRC connection reconfiguration message; or, the radio bearer reconfiguration indication is a control protocol data unit PDU.

A second aspect provides a radio bearer reconfiguration method, where the method includes:

generating, by a base station, a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured; and sending, by the base station, the radio bearer reconfiguration indication to user equipment UE.

In a first possible implementation manner of the second aspect, the generating, by a base station, a radio bearer reconfiguration indication includes:

generating, by the base station, a first radio bearer reconfiguration indication, where the first radio bearer reconfiguration indication includes a radio bearer identifier corresponding to the target radio bearer and reconfigured configuration parameters of all items corresponding to the target radio bearer; or generating, by the base station, a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer; or generating, by the base station, a third radio bearer reconfiguration indication, where the third radio bearer reconfiguration indication includes a radio bearer identifier corresponding to the target radio bearer and reconfigured configuration parameters of some items corresponding to the target radio bearer.

With reference to the second aspect or the first possible implementation manner of the second aspect, in a second possible implementation manner of the second aspect, the radio bearer reconfiguration indication is a radio resource control RRC connection reconfiguration message; or, the radio bearer reconfiguration indication is a control protocol data unit PDU.

A third aspect provides a radio bearer establishment method, where the method includes:

receiving, by user equipment UE, a configuration message sent by a base station, where the configuration message includes a first configuration parameter and a second configuration parameter, where the first configuration parameter carries time-length information of a first status-report prohibition timer, and the second configuration parameter carries time-length information of a second status-report prohibition timer; and determining, by the UE according to a preset rule, to apply the first configuration parameter and/or the second configuration parameter to transmit a first status report or a second status report.

In a first possible implementation manner of the third aspect, the first status report is used to indicate that the UE correctly receives a predefined data packet, and the second status report is used to indicate that at least one data packet of the redefined data packet is not correctly received; and a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

With reference to the third aspect or the first possible implementation manner of the third aspect, in a second possible implementation manner of the third aspect, the determining, by the UE according to a preset rule, to apply the first configuration parameter and/or the second configuration parameter to transmit a first status report or a second status report includes:

determining, by the UE, that the first status-report prohibition timer is expired or is suspended, sending, by the UE, the first status report to the base station, and setting, by the UE, the first status-report prohibition timer to the first prohibition time length; or, determining, by the UE, that the second status-report prohibition timer is expired or is suspended, sending, by the UE, the second status report to the base station, and setting, by the UE, the second status-report prohibition timer to the second prohibition time length.

With reference to the third aspect or the first possible implementation manner of the third aspect, in a third possible implementation manner of the third aspect, the determining, by the UE according to a preset rule, to apply the first configuration parameter and/or the second configuration parameter to transmit a first status report or a second status report includes:

determining, by the UE, that the first status-report prohibition timer is expired or is suspended, sending, by the UE, the first status report to the base station, setting, by the UE, the first status-report prohibition timer to the first prohibition time length, and setting the second status-report prohibition timer to the second prohibition time length; or, determining, by the UE, that the second status-report prohibition timer is expired or is suspended, sending, by the UE, the second status report to the base station, setting, by the UE, the second status-report prohibition timer to the second prohibition time length, and setting, by the UE, the first status-report prohibition timer to the first prohibition time length.

With reference to the third aspect or the first possible implementation manner of the third aspect, in a fourth possible implementation manner of the third aspect, the determining, by the UE according to a preset rule, to apply the first configuration parameter and/or the second configuration parameter to transmit a first status report or a second status report includes:

determining, by the UE, that the first status-report prohibition timer is expired or is suspended, sending, by the UE, the first status report to the base station, and setting, by the UE, the first status-report prohibition timer to the first prohibition time length; or, determining, by the UE, that the first status-report prohibition timer is expired or is suspended and that the second status-report prohibition timer is also expired or is suspended, sending, by the UE, the second status report to the base station, and setting, by the UE, the first status-report prohibition timer to the first prohibition time length, and setting the second status-report prohibition timer to the second prohibition time length.

A fourth aspect provides a radio bearer establishment method, where the method includes:

generating, by a base station, a configuration message, where the configuration message includes a first configuration parameter and a second configuration parameter, the first configuration parameter carries time-length information of a first status-report prohibition timer, and the second configuration parameter carries time-length information of a second status-report prohibition timer; and sending, by the base station, the configuration message to user equipment UE.

In a first possible implementation manner of the fourth aspect, a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

A fifth aspect provides user equipment UE, where the UE includes: a processor, a memory, and a transceiver, where the memory is configured to store one or more instructions, and the instructions are configured to be executed by the processor, where the processor is configured to control the transceiver to receive a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured;

the processor is further configured to release the target radio bearer; and the processor is further configured to transmit signaling and/or data on the corresponding target radio bearer according to the target configuration parameter.

In a first possible implementation manner of the fifth aspect, the radio bearer reconfiguration indication further includes a full configuration identifier; and the processor is specifically configured to release the target radio bearer according to the full configuration identifier.

With reference to the fifth aspect or the first possible implementation manner of the fifth aspect, in a second possible implementation manner of the fifth aspect, the processor is specifically configured to clear, from an original configuration parameter corresponding to the target radio bearer by releasing a protocol entity of the target radio bearer, an original configuration parameter corresponding to the target configuration parameter, where the protocol entity includes a packet data convergence protocol PDCP layer entity and/or a radio link control RLC layer entity.

With reference to the second possible implementation manner of the fifth aspect, in a third possible implementation manner of the fifth aspect, the processor is specifically configured to: if the target configuration parameter is configuration parameters of all items corresponding to the target radio bearer, clear, by the UE, original configuration parameters of all the items corresponding to the target radio bearer; or the processor is specifically configured to: if the target configuration parameter is configuration parameters of some items corresponding to the target radio bearer, clear, by the UE from the original configuration parameter corresponding to the target radio bearer, original configuration parameters of some items corresponding to the target configuration parameter, and reserve original configuration parameters of some other unchanged items.

With reference to the fifth aspect, the first possible implementation manner of the fifth aspect, the second possible implementation manner of the fifth aspect or the third possible implementation manner of the fifth aspect, in a fourth possible implementation manner of the fifth aspect, the processor is further configured to: before the UE releases the target radio bearer, reestablish a protocol entity of the target radio bearer, to process a data packet that is temporarily not completely processed, where the protocol entity includes the PDCP layer entity and/or the RLC layer entity.

With reference to the fourth possible implementation manner of the fifth aspect, in a fifth possible implementation manner of the fifth aspect, the processor is specifically configured to deliver, by using the PDCP layer entity of the target radio bearer to an upper-layer entity of a PDCP layer, a data packet that meets a first predetermined condition, where the data packet that meets the first predetermined condition refers to data packets that are temporarily not delivered to the upper-layer entity by the PDCP layer entity and that have consecutive data packet sequence numbers; and/or the processor is specifically configured to deliver, by using the RLC layer entity of the target radio bearer to the PDCP layer entity, a data packet that meets a second predetermined condition, the data packet that meets the second predetermined condition refers to a data packet that is temporarily not delivered to the PDCP layer entity by the RLC layer entity and that may be reassembled by the RLC layer entity.

With reference to the fourth possible implementation manner of the fifth aspect or the fifth possible implementation manner of the fifth aspect, in a sixth possible implementation manner of the fifth aspect, the processor is specifically configured to reestablish the protocol entity of the target radio bearer according to the full configuration identifier in the radio bearer reconfiguration indication; or, the radio bearer reconfiguration indication further includes a reestablishment identifier, and the processor is specifically configured to reestablish the protocol entity of the target radio bearer according to the reestablishment identifier.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect or the sixth possible implementation manner of the fifth aspect, in a seventh possible implementation manner of the fifth aspect, the processor is specifically configured to: if the target configuration parameter is configuration parameters of all items corresponding to the target radio bearer, transmit, by the UE, signaling and/or data on the corresponding target radio bearer according to the target configuration parameter; or the processor is specifically configured to: if the target configuration parameter is configuration parameters of some items corresponding to the target radio bearer, transmit, by the UE, signaling and/or data on the corresponding target radio bearer according to the target configuration parameter and original configuration parameters of some other unchanged items corresponding to the target radio bearer.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect or the seventh possible implementation manner of the fifth aspect, in an eighth possible implementation manner of the fifth aspect, the radio bearer reconfiguration indication is a radio resource control RRC connection reconfiguration message; or, the radio bearer reconfiguration indication is a control protocol data unit PDU.

A sixth aspect provides a base station, where the base station includes: a processor, a memory, and a transceiver, where the memory is configured to store one or more instructions, and the instructions are configured to be executed by the processor, where the processor is configured to generate a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured; and the processor is further configured to control the transceiver to send the radio bearer reconfiguration indication to user equipment UE.

In a first possible implementation manner of the sixth aspect, the processor is specifically configured to generate a first radio bearer reconfiguration indication, where the first radio bearer reconfiguration indication includes a radio bearer identifier corresponding to the target radio bearer and reconfigured configuration parameters of all items corresponding to the target radio bearer; or the processor is specifically configured to generate a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer; or the processor is specifically configured to generate a third radio bearer reconfiguration indication, where the third radio bearer reconfiguration indication includes a radio bearer identifier corresponding to the target radio bearer and reconfigured configuration parameters of some items corresponding to the target radio bearer.

With reference to the sixth aspect or the first possible implementation manner of the sixth aspect, in a second possible implementation manner of the sixth aspect, the radio bearer reconfiguration indication is a radio resource control RRC connection reconfiguration message; or, the radio bearer reconfiguration indication is a control protocol data unit PDU.

A seventh aspect provides user equipment UE, where the UE includes: a processor, a memory, and a transceiver, where the memory is configured to store one or more instructions, and the instructions are configured to be executed by the processor, where the processor is configured to control the transceiver to receive a configuration message sent by a base station, where the configuration message includes a first configuration parameter and a second configuration parameter, the first configuration parameter carries time-length information of a first status-report prohibition timer, and the second configuration parameter carries time-length information of a second status-report prohibition timer; and the processor is further configured to determine, according to a preset rule, to apply the first configuration parameter and/or the second configuration parameter to transmit a first status report or a second status report.

In a first possible implementation manner of the seventh aspect, the first status report is used to indicate that the UE correctly receives a predefined data packet, and the second status report is used to indicate that at least one data packet of the redefined data packet is not correctly received; and a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

With reference to the seventh aspect or the first possible implementation manner of the seventh aspect, in a second possible implementation manner of the seventh aspect, the processor is specifically configured to: determine that the first status-report prohibition timer is expired or is suspended, send the first status report to the base station, and set the first status-report prohibition timer to the first prohibition time length; or, the processor is specifically configured to: determine that the second status-report prohibition timer is expired or is suspended, send the second status report to the base station, and set the second status-report prohibition timer to the second prohibition time length.

With reference to the seventh aspect or the first possible implementation manner of the seventh aspect, in a third possible implementation manner of the seventh aspect, the processor is specifically configured to: determine that the first status-report prohibition timer is expired or is suspended, send the first status report to the base station, set the first status-report prohibition timer to the first prohibition time length, and set the second status-report prohibition timer to the second prohibition time length; or, the processor is specifically configured to: determine that the second status-report prohibition timer is expired or is suspended, send the second status report to the base station, set the second status-report prohibition timer to the second prohibition time length, and set the first status-report prohibition timer to the first prohibition time length.

With reference to the seventh aspect or the first possible implementation manner of the seventh aspect, in a fourth possible implementation manner of the seventh aspect, the processor is specifically configured to: determine that the first status-report prohibition timer is expired or is suspended, send the first status report to the base station, and set the first status-report prohibition timer to the first prohibition time length; or, the processor is specifically configured to: determine that the first status-report prohibition timer is expired or is suspended and that the second status-report prohibition timer is also expired or is suspended, send the second status report to the base station, set the first status-report prohibition timer to the first prohibition time length, and set the second status-report prohibition timer to the second prohibition time length.

An eighth aspect provides a base station, where the base station includes: a processor, a memory, and a transceiver, where the memory is configured to store one or more instructions, and the instructions are configured to be executed by the processor, where the processor is configured to generate a configuration message, where the configuration message includes a first configuration parameter and a second configuration parameter, the first configuration parameter carries time-length information of a first status-report prohibition timer, and the second configuration parameter carries time-length information of a second status-report prohibition timer; and the processor is further configured to control the transceiver to send the configuration message to user equipment UE.

In a first possible implementation manner of the eighth aspect, a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

A ninth aspect provides a radio bearer reconfiguration apparatus, used in user equipment UE, where the apparatus includes:

a receiving module, configured to receive a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured;

a release module, configured to release the target radio bearer; and a transmission module, configured to transmit signaling and/or data on the corresponding target radio bearer according to the target configuration parameter.

In a first possible implementation manner of the ninth aspect, the radio bearer reconfiguration indication further includes a full configuration identifier; and the release module is specifically configured to release the target radio bearer according to the full configuration identifier.

With reference to the ninth aspect or the first possible implementation manner of the ninth aspect, in a second possible implementation manner of the ninth aspect, the release module is specifically configured to clear, from an original configuration parameter corresponding to the target radio bearer by releasing a protocol entity of the target radio bearer, an original configuration parameter corresponding to the target configuration parameter, where the protocol entity includes a packet data convergence protocol PDCP layer entity and/or a radio link control RLC layer entity.

With reference to the second possible implementation manner of the ninth aspect, in a third possible implementation manner of the ninth aspect, the release module includes: a first clearing unit and/or a second clearing unit;

the first clearing unit is configured to: if the target configuration parameter is configuration parameters of all items corresponding to the target radio bearer, clear original configuration parameters of all the items corresponding to the target radio bearer; and the second clearing unit is configured to: if the target configuration parameter is configuration parameters of some items corresponding to the target radio bearer, clear, from the original configuration parameter corresponding to the target radio bearer, original configuration parameters of some items corresponding to the target configuration parameter, and reserve original configuration parameters of some other unchanged items.

With reference to the ninth aspect, the first possible implementation manner of the ninth aspect, the second possible implementation manner of the ninth aspect or the third possible implementation manner of the ninth aspect, in a fourth possible implementation manner of the ninth aspect, the apparatus further includes:

a reestablishment module, configured to: before releasing the target radio bearer, reestablish a protocol entity of the target radio bearer, to process a data packet that is temporarily not completely processed, where the protocol entity includes the PDCP layer entity and/or the RLC layer entity.

With reference to the fourth possible implementation manner of the ninth aspect, in a fifth possible implementation manner of the ninth aspect, the reestablishment module includes: a first delivery unit and/or a second delivery unit;

the first delivery unit is configured to deliver, by using the PDCP layer entity of the target radio bearer to an upper-layer entity of a PDCP layer, a data packet that meets a first predetermined condition, where the data packet that meets the first predetermined condition refers to data packets that are temporarily not delivered to the upper-layer entity by the PDCP layer entity and that have consecutive data packet sequence numbers; and the second delivery unit is configured to deliver, by using the RLC layer entity of the target radio bearer to the PDCP layer entity, a data packet that meets a second predetermined condition, where the data packet that meets the second predetermined condition refers to a data packet that is temporarily not delivered to the PDCP layer entity by the RLC layer entity and that may be reassembled by the RLC layer entity.

With reference to the fourth possible implementation manner of the ninth aspect or the fifth possible implementation manner of the ninth aspect, in a sixth possible implementation manner of the ninth aspect, the reestablishment module is specifically configured to reestablish the protocol entity of the target radio bearer according to the full configuration identifier in the radio bearer reconfiguration indication; or, the radio bearer reconfiguration indication further includes a reestablishment identifier, where the reestablishment module is specifically configured to reestablish the protocol entity of the target radio bearer according to the reestablishment identifier.

With reference to the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect or the sixth possible implementation manner of the ninth aspect, in a seventh possible implementation manner of the ninth aspect, the transmission module includes: a first transmission unit and/or a second transmission unit;

the first transmission unit is configured to: if the target configuration parameter is configuration parameters of all items corresponding to the target radio bearer, transmit signaling and/or data on the corresponding target radio bearer according to the target configuration parameter; and the second transmission unit is configured to: if the target configuration parameter is configuration parameters of some items corresponding to the target radio bearer, transmit signaling and/or data on the corresponding target radio bearer according to the target configuration parameter and original configuration parameters of some other unchanged items corresponding to the target radio bearer.

With reference to the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect or the seventh possible implementation manner of the ninth aspect, in an eighth possible implementation manner of the ninth aspect, the radio bearer reconfiguration indication is a radio resource control RRC connection reconfiguration message; or, the radio bearer reconfiguration indication is a control protocol data unit PDU.

A tenth aspect provides a radio bearer reconfiguration apparatus, used in a base station, where the apparatus includes:

a generation module, configured to generate a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured; and a sending module, configured to send the radio bearer reconfiguration indication to user equipment UE.

In a first possible implementation manner of the tenth aspect, the generation module includes:

a first generation unit, configured to generate a first radio bearer reconfiguration indication, where the first radio bearer reconfiguration indication includes a radio bearer identifier corresponding to the target radio bearer and reconfigured configuration parameters of all items corresponding to the target radio bearer; and/or a second generation unit, configured to generate a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer; and/or a third generation unit, configured to generate a third radio bearer reconfiguration indication, where the third radio bearer reconfiguration indication includes a radio bearer identifier corresponding to the target radio bearer and reconfigured configuration parameters of some items corresponding to the target radio bearer.

With reference to the tenth aspect or the first possible implementation manner of the tenth aspect, in a second possible implementation manner of the tenth aspect, the radio bearer reconfiguration indication is a radio resource control RRC connection reconfiguration message; or, the radio bearer reconfiguration indication is a control protocol data unit PDU.

An eleventh aspect provides a radio bearer establishment apparatus, used in user equipment UE, where the apparatus includes:

a message receiving module, configured to receive a configuration message sent by a base station, where the configuration message includes a first configuration parameter and a second configuration parameter, the first configuration parameter carries time-length information of a first status-report prohibition timer, and the second configuration parameter carries time-length information of a second status-report prohibition timer; and a parameter application module, configured to determine, according to a preset rule, to apply the first configuration parameter and/or the second configuration parameter to transmit a first status report or a second status report.

In a first possible implementation manner of the eleventh aspect, the first status report is used to indicate that the UE correctly receives a predefined data packet, and the second status report is used to indicate that at least one data packet of the redefined data packet is not correctly received; and a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

With reference to the eleventh aspect or the first possible implementation manner of the eleventh aspect, in a second possible implementation manner of the eleventh aspect, the parameter application module includes: a first determining unit, a first sending unit, and a first setting unit, where the first determining unit is configured to determine that the first status-report prohibition timer is expired or is suspended; the first sending unit is configured to send the first status report to the base station; and the first setting unit is configured to set the first status-report prohibition timer to the first prohibition time length; or, the parameter application module includes: a second determining unit, a second sending unit, and a second setting unit, where the second determining unit is configured to determine that the second status-report prohibition timer is expired or is suspended; the second sending unit is configured to send the second status report to the base station; and the second setting unit is configured to set the second status-report prohibition timer to the second prohibition time length.

With reference to the eleventh aspect or the first possible implementation manner of the eleventh aspect, in a third possible implementation manner of the eleventh aspect, the parameter application module includes: a third determining unit, a third sending unit, and a third setting unit, where the third determining unit is configured to determine that the first status-report prohibition timer is expired or is suspended; the third sending unit is configured to send the first status report to the base station; and the third setting unit is configured to: set the first status-report prohibition timer to the first prohibition time length, and set the second status-report prohibition timer to the second prohibition time length; or, the parameter application module includes: a fourth determining unit, a fourth sending unit, and a fourth setting unit, where the fourth determining unit is configured to determine that the second status-report prohibition timer is expired or is suspended; the fourth sending unit is configured to send the second status report to the base station; and the fourth setting unit is configured to: set the second status-report prohibition timer to the second prohibition time length, and set the first status-report prohibition timer to the first prohibition time length.

With reference to the eleventh aspect or the first possible implementation manner of the eleventh aspect, in a fourth possible implementation manner of the eleventh aspect, the parameter application module includes: a fifth determining unit, a fifth sending unit, and a fifth setting unit, where the fifth determining unit is configured to determine that the first status-report prohibition timer is expired or is suspended; the fifth sending unit is configured to send the first status report to the base station; and the fifth setting unit is configured to set the first status-report prohibition timer to the first prohibition time length; or, the parameter application module includes: a sixth determining unit, a sixth sending unit, and a sixth setting unit, where the sixth determining unit is configured to determine that the first status-report prohibition timer is expired or is suspended and that the second status-report prohibition timer is also expired or is suspended; the sixth sending unit is configured to send the second status report to the base station; and the sixth setting unit is configured to: set the first status-report prohibition timer to the first prohibition time length, and set the second status-report prohibition timer to the second prohibition time length.

A twelfth aspect provides a radio bearer establishment apparatus, used in a base station, where the apparatus includes:

a message generation module, configured to generate a configuration message, where the configuration message includes a first configuration parameter and a second configuration parameter, the first configuration parameter carries time-length information of a first status-report prohibition timer, and the second configuration parameter carries time-length information of a second status-report prohibition timer; and a message sending module, configured to send the configuration message to user equipment UE.

In a first possible implementation manner of the twelfth aspect, a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

Beneficial effects of the technical solutions provided in embodiments of the present disclosure include:

A radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, in a process of reconfiguration, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
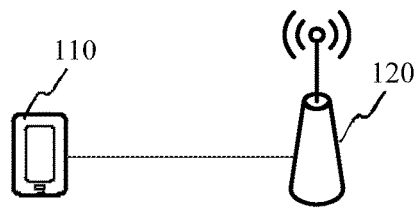
FIG. 1 is a schematic structural diagram of an implementation environment used in embodiments of the present disclosure.

Referring to FIG. 1, FIG. 1 is a schematic structural diagram of an implementation environment used in embodiments of the present disclosure. The implementation environment may include UE 110 and a base station 120.

The UE 110 may be a mobile phone, a tablet computer, an e-book reader, a personal digital assistant (English: Personal Digital Assistant; PDA for short), a laptop portable computer, a desktop computer, a smart TV, and the like.

The UE 110 and the base station 120 may be connected by using an air interface (English: Air Interface; AI for short). For example, the UE 110 and the base station 120 are connected by using a radio interface Uu interface.

The base station 120 may be an evolved base station (English: Evolved Node Base station; eNB for short) in a Long Term Evolution (English: Long Term Evolution; LTE for short) system or an LTE-A (English: LTE-Advanced) system, or may be a base station in another communications system.

The UE 110 and the base station 120 are connected by establishing RRC, so as to perform transmission of control plane signaling and/or user plane data. Specifically, an SRB1 and/or an SRB2 may be established between the UE 110 and the base station 120 to perform transmission of control plane signaling, and at least one DRB may be further established between the UE 110 and the base station 120 to perform transmission of user plane data. In addition, a process of establishing an RRC connection is content that is easily conceived of by a person skilled in the art, and details are not described herein.

Figure 2:
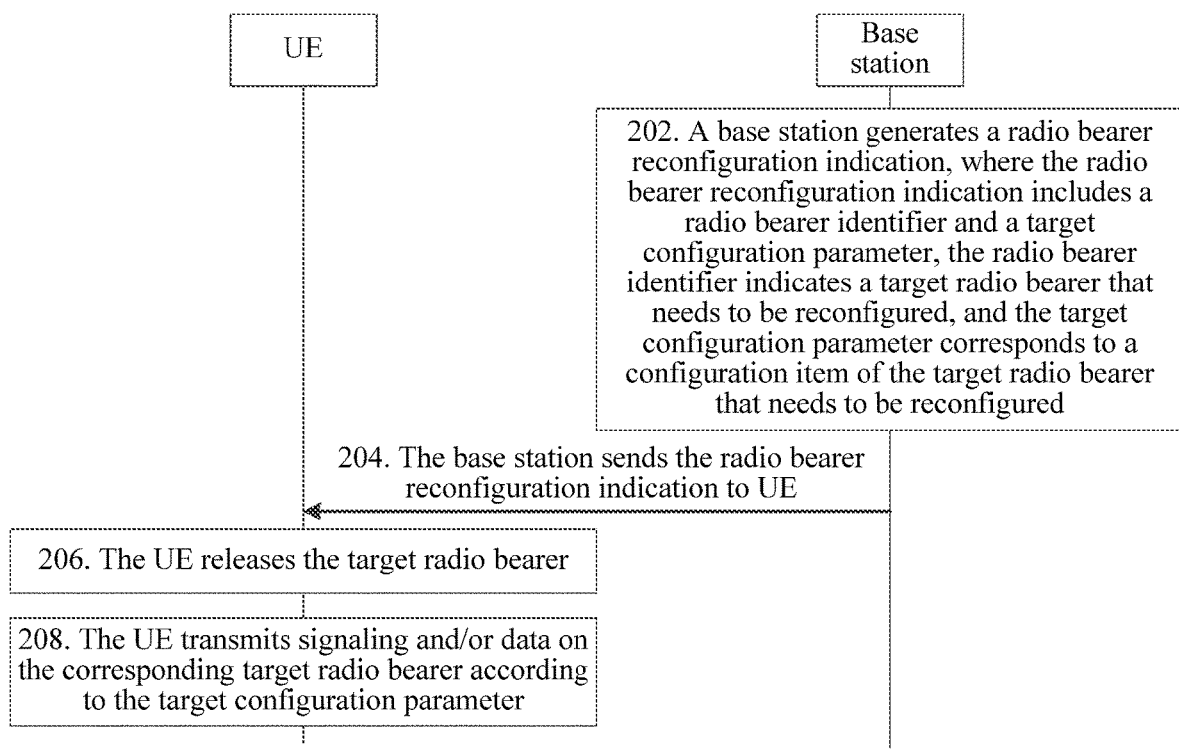
FIG. 2 is a method flowchart of a radio bearer reconfiguration method according to an embodiment of the present disclosure.

Referring to FIG. 2, FIG. 2 is a method flowchart of a radio bearer reconfiguration method provided in an embodiment of the present disclosure. This embodiment is described by using an example in which the radio bearer reconfiguration method is applied to the implementation environment shown in FIG. 1. The radio bearer reconfiguration method may include the following steps.

Step 202: A base station generates a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

When the base station generates the radio bearer reconfiguration indication, the radio bearer identifier (English: Radio Bearer Identifier; RB ID for short) and the target configuration parameter that correspond to the target radio bearer that needs to be reconfigured are configured in the radio bearer reconfiguration indication. That is, the radio bearer reconfiguration indication does not include an RB ID and an original configuration parameter that correspond to another radio bearer that does not need to be reconfigured. The target radio bearer usually includes one or more DRBs, but is not limited thereto, and the target radio bearer may include an SRB1 and/or an SRB2.

For example, four RBs, that is, the SRB1, a DRB1, a DRB2, and a DRB3 are established between UE and the base station. If the DRB1 needs to be reconfigured, the base station generates a radio bearer reconfiguration indication that carries an RB ID corresponding to the DRB1 and a configuration parameter corresponding to a configuration item of the DRB1.

In addition, when reconfiguring the target radio bearer, the base station may reconfigure at least one of the following configuration parameters corresponding to the target radio bearer: at least one packet data convergence protocol (English: Packet Data Convergence Protocol; PDCP for short) layer parameter, at least one radio link control (English: Radio Link Control; RLC for short) layer parameter, and at least one security parameter.

Step 204: The base station sends the radio bearer reconfiguration indication to the UE.

The parameters that are included in the radio bearer reconfiguration indication are fewer than those included in an RRC connection reconfiguration message used in the background, that is, an RB ID and an original configuration parameter that correspond to another radio bearer that does not need to be reconfigured are reduced. Therefore, signaling resources to use during transmission of the radio bearer reconfiguration indication between the UE and the base station are reduced, so that an objective of reducing signaling overheads is achieved.

Correspondingly, the UE receives the radio bearer reconfiguration indication sent by the base station.

Step 206: The UE releases the target radio bearer.

The UE releases the target radio bearer corresponding to the radio bearer identifier according to an indication of the radio bearer identifier included in the radio bearer reconfiguration indication.

In this embodiment, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

For example, the foregoing four RBs are still used. If the DRB1 needs to be reconfigured, the UE releases only the DRB1, but does not need to release the SRB1, the DRB2, and the DRB3.

Step 208: The UE transmits signaling and/or data on the corresponding target radio bearer according to the target configuration parameter.

It should be noted that the foregoing step 202 and step 204 may be separately implemented as the radio bearer reconfiguration method on a side of the base station, and the foregoing step 204 to step 208 may be separately implemented as the radio bearer reconfiguration method on a side of UE.

In conclusion, in the radio bearer reconfiguration method provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, in a process of reconfiguration, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

Figure 3:
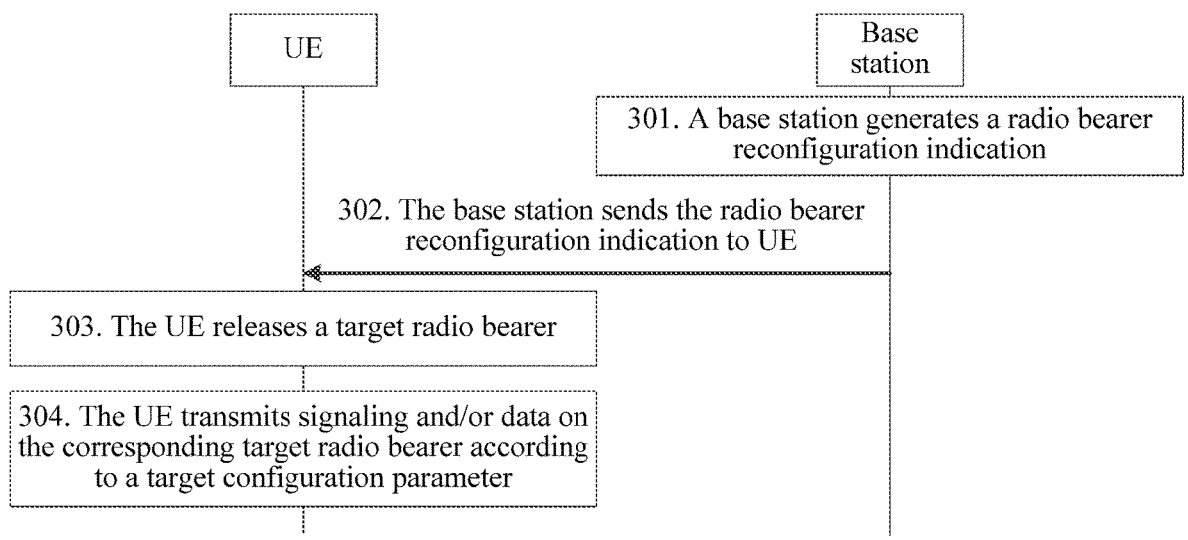
FIG. 3 is a method flowchart of a radio bearer reconfiguration method according to another embodiment of the present disclosure.

Referring to FIG. 3, FIG. 3 is a method flowchart of a radio bearer reconfiguration method provided in another embodiment of the present disclosure. This embodiment is described by using an example in which the radio bearer reconfiguration method is applied to the implementation environment shown in FIG. 1. The radio bearer reconfiguration method may include the following steps.

Step 301: A base station generates a radio bearer reconfiguration indication.

The radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

When the base station generates the radio bearer reconfiguration indication, the RB ID and the target configuration parameter that correspond to the target radio bearer that needs to be reconfigured are configured in the radio bearer reconfiguration indication. That is, the radio bearer reconfiguration indication does not include an RB ID and an original configuration parameter that correspond to another radio bearer that does not need to be reconfigured. The target radio bearer usually includes one or more DRBs, but is not limited thereto, and the target radio bearer may include an SRB1 and/or an SRB2.

For example, four RBs, that is, the SRB1, a DRB1, a DRB2, and a DRB3 are established between UE and the base station. If the DRB1 needs to be reconfigured, the base station generates a radio bearer reconfiguration indication that carries an RB ID corresponding to the DRB1 and a configuration parameter corresponding to a configuration item of the DRB1.

In addition, when reconfiguring the target radio bearer, the base station may reconfigure at least one of the following configuration parameters corresponding to the target radio bearer: at least one PDCP layer parameter, at least one PLC layer parameter, and at least one security parameter.

The PDCP layer parameter includes, but is not limited to, at least one of the following parameters: a discarding timer, header compression information, indication information used to indicate whether to send a PDCP status report (the parameter is used for an RLC AM mode), and length information (the parameter is used for an RLC UM mode) of a PDCP serial number (English: Serial Number; SN for short).

For the RLC AM mode, an RLC layer parameter includes an uplink RLC AM configuration parameter and/or a downlink RLC AM configuration parameter. The uplink RLC AM configuration parameter includes, but is not limited to, at least one of the following parameters: a polling retransmission timer, a polling PDU (English: Protocol Data Unit; Chinese: protocol data unit), a polling byte, maximum retransmission times, and an extended length indication field. The downlink RLC AM configuration parameter includes, but is not limited to, at least one of the following parameters: a resequencing timer, a status-report prohibition timer, and an extended length indication field.

For the RLC UM mode, an RLC layer configuration parameter includes an uplink RLC UM configuration parameter and/or a downlink RLC UM configuration parameter. The uplink RLC UM configuration parameter includes, but is not limited to, a serial number length. The downlink RLC UM configuration parameter includes, but is not limited to, at least one of the following parameters: a serial number length and a resequencing timer.

The security parameter includes, but is not limited to, at least one of the following parameters: an encryption algorithm, a key (English: Key) corresponding to the encryption algorithm, an integrity protection algorithm, a key corresponding to the integrity protection algorithm.

It should be noted that the foregoing configuration parameters are only an example. As more service scenarios and requirements appear, more configuration parameters may be extended. This is not limited in this embodiment. In addition, in another different division manner, the security parameter may be included in a PDCP layer parameter. This is also not limited in this embodiment.

Optionally, when a media access control (English: Media Access Control; MAC for short) layer parameter corresponding to the target radio bearer needs to be reconfigured, the radio bearer reconfiguration indication may further include a reconfigured MAC layer parameter. When a physical (English: physical; PHY for short) layer parameter corresponding to the target radio bearer needs to be reconfigured, the radio bearer reconfiguration indication may further include a reconfigured PHY layer parameter.

Optionally, the radio bearer reconfiguration indication may further include a full configuration identifier. The full configuration identifier is used to instruct the UE to release and/or reestablish a protocol entity of the target radio bearer. For example, the full configuration identifier may be a Full Config identifier. Optionally, the radio bearer reconfiguration indication may further include a reestablishment identifier. The reestablishment identifier is used to instruct the UE to reestablish a protocol entity of the target radio bearer.

In addition, this step may include several possible implementation manners in the following:

1. The base station generates a first radio bearer reconfiguration indication, where the first radio bearer reconfiguration indication includes a radio bearer identifier corresponding to the target radio bearer and reconfigured configuration parameters of all items corresponding to the target radio bearer.

For example, the original configuration parameters of all the items corresponding to the target radio bearer are A1, B1, and C1. When the original configuration parameters of the three items all need to be reconfigured, assuming that the reconfigured configuration parameters are sequentially A2, B2, and C2, the first radio bearer reconfiguration indication includes the RB ID that corresponds to the target radio bearer and A2, B2, and C2.

2. The base station generates a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer.

For example, the original configuration parameters of all the items corresponding to the target radio bearer are A1, B1, and C1. When only a first original configuration parameter A1 needs to be reconfigured, assuming that the reconfigured configuration parameter is A2, the second radio bearer reconfiguration indication includes the RB ID that corresponds to the target radio bearer and A2, B1, and C1.

3. The base station generates a third radio bearer reconfiguration indication, where the third radio bearer reconfiguration indication includes a radio bearer identifier corresponding to the target radio bearer and reconfigured configuration parameters of some items corresponding to the target radio bearer.

For example, the original configuration parameters of all the items corresponding to the target radio bearer are A1, B1, and C1. When only a first original configuration parameter A1 needs to be reconfigured, assuming that the reconfigured configuration parameter is A2, the third radio bearer reconfiguration indication includes the RB ID that corresponds to the target radio bearer and A2.

The foregoing third possible implementation manner may reduce more signaling overheads than the second possible implementation manner may reduce.

In addition, the radio bearer reconfiguration indication may be an RRC connection reconfiguration message. Alternatively, the radio bearer reconfiguration indication may be a control PDU. When the radio bearer reconfiguration indication is a control PDU, the base station may generate a first control PDU by using a PDCP layer entity of the target radio bearer and/or generate a second control PDU by using an RLC layer entity of the target radio bearer. The first control PDU may include at least one of a reconfigured PDCP layer parameter, a reconfigured RLC layer parameter, or a reconfigured security parameter. The second control PDU may include at least one of the reconfigured PDCP layer parameter, the reconfigured RLC layer parameter, or the reconfigured security parameter. The RRC layer entity of the target radio bearer may determine the foregoing reconfigured configuration parameters, and provide the foregoing reconfigured configuration parameters to the PDCP layer entity and/or the RLC layer entity.

In a possible implementation manner, the PDCP layer entity of the target radio bearer generates a first control PDU that includes the reconfigured PDCP layer parameter and the reconfigured RLC layer parameter, the PDCP layer entity sends the first control PDU to the RLC layer entity, and the RLC layer entity generates a second control PDU that includes the reconfigured RLC layer parameter. The reconfigured RLC layer parameter included in the second control PDU may be obtained by the RLC layer entity by using multiplexing first control PDUs.

Step 302: The base station sends the radio bearer reconfiguration indication to the UE.

When the radio bearer reconfiguration indication is the RRC connection reconfiguration message, the base station sends the radio bearer reconfiguration indication to the UE in a form of an RRC message. When the radio bearer reconfiguration indication is a control PDU, the base station sends the radio bearer reconfiguration indication to the UE in a form of in-band information.

Regardless of the form in which the radio bearer reconfiguration indication is sent, the parameters that are included in the radio bearer reconfiguration indication are fewer than those included in an RRC connection reconfiguration message used in the background, that is, an RB ID and an original configuration parameter that correspond to another radio bearer that does not need to be reconfigured are reduced. Therefore, signaling resources to use during transmission of the radio bearer reconfiguration indication between the UE and the base station are reduced, so that an objective of reducing signaling overheads is achieved.

Correspondingly, the UE receives the radio bearer reconfiguration indication sent by the base station.

Step 303: The UE releases the target radio bearer.

The UE releases the target radio bearer corresponding to the radio bearer identifier according to an indication of the radio bearer identifier included in the radio bearer reconfiguration indication.

In this embodiment, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

For example, the foregoing four RBs are still used. If the DRB1 needs to be reconfigured, the UE releases only the DRB1, but does not need to release the SRB1, the DRB2, and the DRB3.

Specifically, this step includes: clearing, by the UE from the original configuration parameter corresponding to the target radio bearer by releasing a protocol entity of the target radio bearer, the original configuration parameter corresponding to the target configuration parameter.

The protocol entity includes a PDCP layer entity and/or an RLC layer entity. Specifically, if the target configuration parameter includes at least one reconfigured PDCP layer parameter, the UE clears, from an original PDCP layer parameter corresponding to the target radio bearer by releasing the PDCP layer entity of the target radio bearer, the original configuration parameter corresponding to the reconfigured PDCP layer parameter. For example, if the target configuration parameter includes a reconfigured discarding timer, the UE clears an original discarding timer from the original PDCP layer parameter corresponding to the target radio bearer by releasing the PDCP layer entity of the target radio bearer. Similarly, if the target configuration parameter includes at least one reconfigured RLC layer parameter, the UE clears, from an original RLC layer parameter corresponding to the target radio bearer by releasing the RLC layer entity of the target radio bearer, the original configuration parameter corresponding to the reconfigured RLC layer parameter.

In addition, this step may include the following two possible implementation manners:

1. If the target configuration parameter is configuration parameters of all items corresponding to the target radio bearer, the UE clears the original configuration parameters of all the items corresponding to the target radio bearer.

For example, the original configuration parameters of all the items corresponding to the target radio bearer are A1, B1, and C1. The base station reconfigures original configuration parameters of all the three items. Assuming that the reconfigured configuration parameters are sequentially A2, B2, and C2, the UE clears A1, B1, and C1.

2. If the target configuration parameter is configuration parameters of some items corresponding to the target radio bearer, the UE clears, from the original configuration parameter corresponding to the target radio bearer, original configuration parameters of some items corresponding to the target configuration parameter, and reserves original configuration parameters of some other unchanged items.

For example, the original configuration parameters of all the items corresponding to the target radio bearer are A1, B1, and C1. The base station reconfigures only a first original configuration parameter A1. Assuming that the reconfigured configuration parameter is A2, the UE clears A1, and reserves B1 and C1.

In this embodiment, UE clears, from an original configuration parameter corresponding to a target radio bearer, an original configuration parameter corresponding to a target configuration parameter, so that a problem such as a failure to read data because configuration parameters used by the UE and a base station when the UE and the base station transmit signaling and/or data are not synchronous can be avoided.

In addition, in an actual application, a different manner may be used to enable the UE to determine whether to performing the foregoing step 303.

In a possible implementation manner, the UE may execute step 303 by default or skip execution of step 303 by default according to a protocol regulation.

In another possible implementation manner, the radio bearer reconfiguration indication sent by the base station to the UE may further include a full configuration identifier (Full Config identifier). The Full Config identifier is used to instruct the UE to release the target radio bearer. Correspondingly, after receiving the radio bearer reconfiguration indication sent by the base station, the UE releases the target radio bearer according to the Full Config identifier.

It should be further noted that UE releases only a protocol entity of a target radio bearer that needs to be reconfigured, that is, the UE clears only original configuration parameters of all or some items corresponding to the target radio bearer that needs to be reconfigured, but does not release a protocol entity of another radio bearer that does not need to be reconfigured, so that during reconfiguration of an RB, normal working of another RB is not affected, and at the same time an effect of reducing operations of the UE may further be achieved.

Optionally, before the foregoing step 303, the UE may further perform the following step.

The UE reestablishes a protocol entity of the target radio bearer, to process a data packet that is temporarily not completely processed. The protocol entity includes a PDCP layer entity and/or an RLC layer entity. Specifically, this step may include one or more of several possible implementation manners in the following:

1. The UE delivers, to an upper-layer entity of a PDCP layer by using the PDCP layer entity of the target radio bearer, a data packet that meets a first predetermined condition.

The data packet that meets the first predetermined condition refers to data packets that are temporarily not delivered to the upper-layer entity by the PDCP layer entity and that have consecutive data packet sequence numbers.

2. The UE delivers, to the PDCP layer entity, by using the RLC layer entity of the target radio bearer, a data packet that meets a second predetermined condition.

The data packet that meets the second predetermined condition refers to a data packet that is temporarily not delivered to the PDCP layer entity by the RLC layer entity and that may be reassembled (English: reassemble) by the RLC layer entity.

3. The UE discards, by using the RLC layer entity of the target radio bearer, a data packet that is reassembled and that has been delivered to the PDCP layer entity.

4. The UE discards transmit-end data by using the RLC layer entity of the target radio bearer.

The foregoing transmit-end data may be an RLC SDU (English: Service Data Unit; Chinese: service data unit) and/or an RLC PDU.

5. The UE stops and resets all timers corresponding to the target radio bearer.

6. The UE resets all status variables corresponding to the target radio bearer, where the status variable is used to maintain reception and transmission of a data packet.

Before releasing a target radio bearer, the UE processes, by reestablishing the protocol entity of the target radio bearer, a data packet that is temporarily not completely processed, so that a data packet loss can be avoided or reduced.

Optionally, when the target configuration parameter includes only an uplink transmission-related parameter, to prevent normal working of downlink transmission from being affected and simplify operations of the UE, the UE may perform the foregoing reestablishment operation on only a protocol entity that is used to implement a function of uplink transmission. An original configuration parameter continues to be applied to a protocol entity that is used to implement a function of downlink transmission, so as to continue to perform an original operation. Similarly, when the target configuration parameter includes only a downlink transmission-related parameter, to prevent normal working of uplink transmission from being affected and simplify operations of the UE, the UE may perform the foregoing reestablishment operation on only the protocol entity that is used to implement a function of downlink transmission. An original configuration parameter continues to be applied to the protocol entity that is used to implement a function of uplink transmission, so as to continue to perform an original operation.

Optionally, when the target configuration parameter includes a reconfigured security parameter, when the UE performs the foregoing reestablishment operation and after the UE performs the foregoing reestablishment operation, a reconfigured security parameter is applied to perform encryption processing and/or integrity protection on a data packet. When the target configuration parameter does not include a reconfigured security parameter, when the UE performs the foregoing reestablishment operation and after the UE performs the foregoing reestablishment operation, an original security parameter is applied to perform encryption processing and/or integrity protection on a data packet.

In addition, in an actual application, a different manner may be used to enable the UE to determine whether to perform the foregoing reestablishment operation.

In a possible implementation manner, the UE may perform execution by default or skip execution by default according to a protocol regulation.

In another possible implementation manner, the radio bearer reconfiguration indication sent by the base station to the UE may further include a full configuration identifier (Full Config identifier), where the Full Config identifier is used to instruct the UE to reestablish the protocol entity of the target radio bearer. Correspondingly, after receiving the radio bearer reconfiguration indication sent by the base station, the UE reestablishes the protocol entity of the target radio bearer according to the Full Config identifier.

In another possible implementation manner, the radio bearer reconfiguration indication sent by the base station to the UE may further include a reestablishment identifier. The reestablishment identifier is used to instruct the UE to reestablish a protocol entity of the target radio bearer. Correspondingly, after receiving the radio bearer reconfiguration indication sent by the base station, the UE reestablishes the protocol entity of the target radio bearer according to the reestablishment identifier.

Step 304: The UE transmits signaling and/or data on the corresponding target radio bearer according to the target configuration parameter.

This step may include the following two possible implementation manners:

1. If the target configuration parameter is configuration parameters of all items corresponding to the target radio bearer, the UE transmits signaling and/or data on the corresponding target radio bearer according to the target configuration parameter.

For example, the original configuration parameters of all the items corresponding to the target radio bearer are A1, B1, and C1. The base station reconfigures original configuration parameters of all the three items. Assuming that the reconfigured configuration parameters are sequentially A2, B2, and C2, the UE transmits signaling and/or data on the target radio bearer according to A2, B2, and C2.

2. If the target configuration parameter is configuration parameters of some items corresponding to the target radio bearer, the UE transmits, according to the target configuration parameter and original configuration parameters of some other unchanged items corresponding to the target radio bearer, signaling and/or data on the corresponding target radio bearer.

For example, the original configuration parameters of all the items corresponding to the target radio bearer are A1, B1, and C1. The base station reconfigures only a first original configuration parameter A1. Assuming that the reconfigured configuration parameter is A2, the UE transmits signaling and/or data on the target radio bearer according to A2, B1, and C1.

Optionally, after completing reconfiguration of the target radio bearer, the UE may send a reconfiguration complete response to the base station. Corresponding to two different implementation forms of the radio bearer reconfiguration indication, the UE may feed back the reconfiguration complete response to the base station in a form of an RRC message or in a form of in-band information.

It should be noted that the foregoing step 301 and step 302 may be separately implemented as the radio bearer reconfiguration method on a side of the base station, and the foregoing step 302 to step 304 may be separately implemented as the radio bearer reconfiguration method on a side of UE.

In conclusion, in the radio bearer reconfiguration method provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, in a process of reconfiguration, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

In addition, UE clears, from an original configuration parameter corresponding to a target radio bearer, an original configuration parameter corresponding to a target configuration parameter, so that a problem such as a failure to read data because configuration parameters used by the UE and a base station when the UE and the base station transmit signaling and/or data are not synchronous can be avoided.

In addition, before releasing a protocol entity of a target radio bearer, UE further processes, by reestablishing a protocol entity of the target radio bearer, a data packet that is temporarily not completely processed, so that a data packet loss can be avoided or reduced.

Apparatus embodiments corresponding to the foregoing method embodiments are provided below. For details that are not disclosed in the apparatus embodiments, reference may be made to the foregoing method embodiments.

Figure 4:
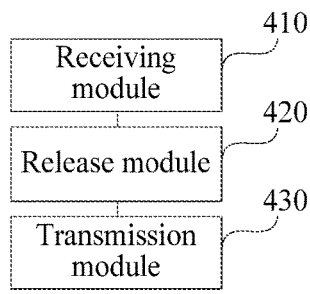
FIG. 4 is a structural block diagram of a radio bearer reconfiguration apparatus according to an embodiment of the present disclosure.

Referring to FIG. 4, FIG. 4 is a structural block diagram of a radio bearer reconfiguration apparatus provided in an embodiment of the present disclosure. The radio bearer reconfiguration apparatus may be implemented as a part of the UE or the entire UE in the implementation environment shown in FIG. 1 by using software, hardware or a combination of software and hardware. The radio bearer reconfiguration apparatus may include: a receiving module 410, a release module 420, and a transmission module 430.

The receiving module 410 is configured to receive a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The release module 420 is configured to release the target radio bearer.

The transmission module 430 is configured to transmit signaling and/or data on the corresponding target radio bearer according to the target configuration parameter.

In conclusion, for the radio bearer reconfiguration apparatus provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, in a process of reconfiguration, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

Figure 5:
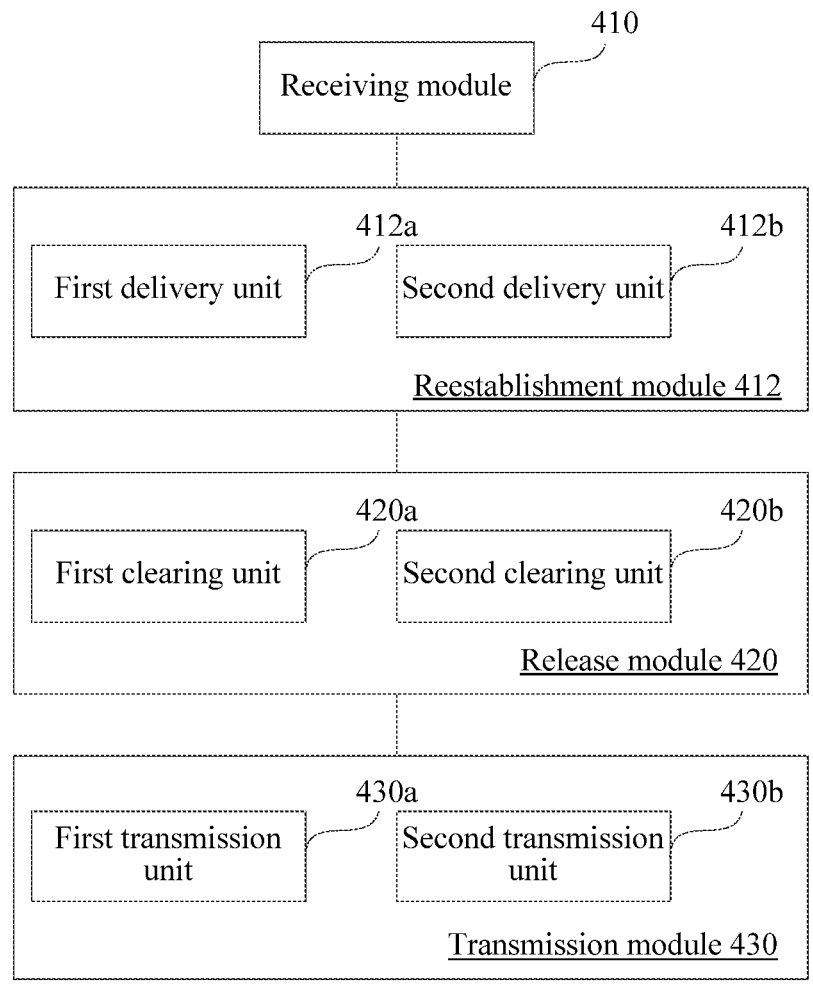
FIG. 5 is a structural block diagram of a radio bearer reconfiguration apparatus according to another embodiment of the present disclosure.

Referring to FIG. 5, FIG. 5 is a structural block diagram of a radio bearer reconfiguration apparatus provided in another embodiment of the present disclosure. The radio bearer reconfiguration apparatus may be implemented as a part of the UE or the entire UE in the implementation environment shown in FIG. 1 by using software, hardware or a combination of software and hardware. The radio bearer reconfiguration apparatus may include: a receiving module 410, a release module 420, and a transmission module 430.

The receiving module 410 is configured to receive a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The release module 420 is configured to release the target radio bearer.

The transmission module 430 is configured to transmit signaling and/or data on the corresponding target radio bearer according to the target configuration parameter.

Optionally, the radio bearer reconfiguration indication further includes a full configuration identifier; and the release module 420 is specifically configured to release the target radio bearer according to the full configuration identifier.

Optionally, the release module 420 is specifically configured to clear, from an original configuration parameter corresponding to the target radio bearer by releasing a protocol entity of the target radio bearer, an original configuration parameter corresponding to the target configuration parameter.

The protocol entity includes a packet data convergence protocol PDCP layer entity and/or a radio link control RLC layer entity.

In a possible implementation manner, the release module 420 includes: a first clearing unit 420a and/or a second clearing unit 420b.

The first clearing unit 420a is configured to: if the target configuration parameter is configuration parameters of all items corresponding to the target radio bearer, clear original configuration parameters of all the items corresponding to the target radio bearer.

The second clearing unit 420b is configured to: if the target configuration parameter is configuration parameters of some items corresponding to the target radio bearer, clear, from the original configuration parameter corresponding to the target radio bearer, original configuration parameters of some items corresponding to the target configuration parameter, and reserve original configuration parameters of some other unchanged items.

Optionally, the apparatus further includes: a reestablishment module 412.

The reestablishment module 412 is configured to: before releasing the target radio bearer, reestablish a protocol entity of the target radio bearer, to process a data packet that is temporarily not completely processed.

The protocol entity includes the PDCP layer entity and/or the RLC layer entity.

In a possible implementation manner, the reestablishment module 412 includes: a first delivery unit 412a and/or a second delivery unit 412b.

The first delivery unit 412a is configured to deliver, by using the PDCP layer entity of the target radio bearer to an upper-layer entity of a PDCP layer, a data packet that meets a first predetermined condition, where the data packet that meets the first predetermined condition refers to data packets that are temporarily not delivered to the upper-layer entity by the PDCP layer entity and that have consecutive data packet sequence numbers.

The second delivery unit 412b is configured to deliver, by using the RLC layer entity of the target radio bearer to the PDCP layer entity, a data packet that meets a second predetermined condition, where the data packet that meets the second predetermined condition refers to a data packet that is temporarily not delivered to the PDCP layer entity by the RLC layer entity and that may be reassembled by the RLC layer entity.

Optionally, the reestablishment module 412 is specifically configured to reestablish the protocol entity of the target radio bearer according to the full configuration identifier in the radio bearer reconfiguration indication.

Alternatively, the radio bearer reconfiguration indication further includes a reestablishment identifier, and the reestablishment module 412 is specifically configured to reestablish the protocol entity of the target radio bearer according to the reestablishment identifier.

In a possible implementation manner, the transmission module 430 includes: a first transmission unit 430a and/or a second transmission unit 430b.

The first transmission unit 430a is configured to: if the target configuration parameter is configuration parameters of all items corresponding to the target radio bearer, transmit signaling and/or data on the corresponding target radio bearer according to the target configuration parameter.

The second transmission unit 430b is configured to: if the target configuration parameter is configuration parameters of some items corresponding to the target radio bearer, transmit signaling and/or data on the corresponding target radio bearer according to the target configuration parameter and original configuration parameters of some other unchanged items corresponding to the target radio bearer.

Optionally, the radio bearer reconfiguration indication is a radio resource control RRC connection reconfiguration message; or, the radio bearer reconfiguration indication is a control protocol data unit PDU.

In conclusion, in the radio bearer reconfiguration apparatus provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, in a process of reconfiguration, UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

In addition, UE clears, from an original configuration parameter corresponding to a target radio bearer, an original configuration parameter corresponding to a target configuration parameter, so that a problem such as a failure to read data because configuration parameters used by the UE and a base station when the UE and the base station transmit signaling and/or data are not synchronous can be avoided.

In addition, before releasing a protocol entity of a target radio bearer, UE further processes, by reestablishing the protocol entity of the target radio bearer, a data packet that is temporarily not completely processed, so that a data packet loss can be avoided or reduced.

Figure 6:
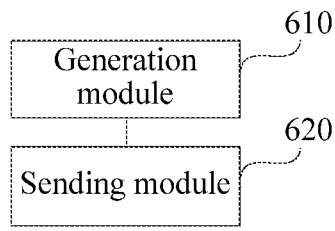
FIG. 6 is a structural block diagram of a radio bearer reconfiguration apparatus according to another embodiment of the present disclosure.

Referring to FIG. 6, FIG. 6 is a structural block diagram of a radio bearer reconfiguration apparatus provided in another embodiment of the present disclosure. The radio bearer reconfiguration apparatus may be implemented as a part of the base station or the entire base station in the implementation environment shown in FIG. 1 by using software, hardware or a combination of software and hardware. The radio bearer reconfiguration apparatus may include: a generation module 610 and a sending module 620.

The generation module 610 is configured to generate a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The sending module 620 is configured to send the radio bearer reconfiguration indication to user equipment UE.

In conclusion, for the radio bearer reconfiguration apparatus provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

Figure 7:
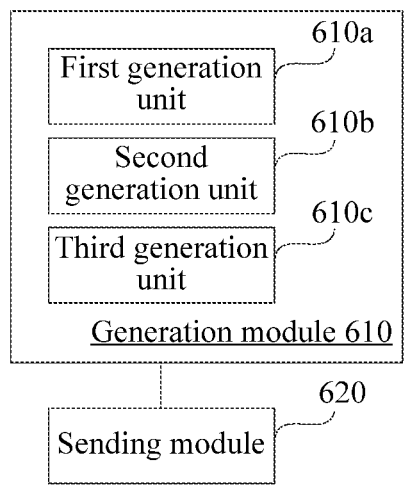
FIG. 7 is a structural block diagram of a radio bearer reconfiguration apparatus according to another embodiment of the present disclosure.

Referring to FIG. 7, FIG. 7 is a structural block diagram of a radio bearer reconfiguration apparatus provided in another embodiment of the present disclosure. The radio bearer reconfiguration apparatus may be implemented as a part of the base station or the entire base station in the implementation environment shown in FIG. 1 by using software, hardware or a combination of software and hardware. The radio bearer reconfiguration apparatus may include: a generation module 610 and a sending module 620.

The generation module 610 is configured to generate a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The sending module 620 is configured to send the radio bearer reconfiguration indication to user equipment UE.

Optionally, the generation module 610 includes:

a first generation unit 610a, configured to generate a first radio bearer reconfiguration indication, where the first radio bearer reconfiguration indication includes a radio bearer identifier corresponding to the target radio bearer and reconfigured configuration parameters of all items corresponding to the target radio bearer; and/or a second generation unit 610b, configured to generate a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer; and/or a third generation unit 610c, configured to generate a third radio bearer reconfiguration indication, where the third radio bearer reconfiguration indication includes a radio bearer identifier corresponding to the target radio bearer and reconfigured configuration parameters of some items corresponding to the target radio bearer.

Optionally, the radio bearer reconfiguration indication is a radio resource control RRC connection reconfiguration message; or, the radio bearer reconfiguration indication is a control protocol data unit PDU.

In conclusion, for the radio bearer reconfiguration apparatus provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and a base station in a related technology is resolved. Used signaling resources are reduced and signaling overheads are reduced.

In addition, the base station generates the foregoing third radio bearer reconfiguration indication, so that signaling overheads can be further reduced.

It should be noted that when the radio bearer reconfiguration apparatus provided in the foregoing embodiments reconfigures a target radio bearer, the foregoing division of functional modules is used as only an example for description. In an actual application, the foregoing functions may be allocated according to a requirement to be completed by different functional modules. That is, an internal structure of a device is divided into different functional modules, to complete all or some of the functions described above. In addition, the radio bearer reconfiguration apparatus provided in the foregoing embodiments and the method embodiments of the radio bearer reconfiguration method belong to a same concept. For details of a specific implementation process of the radio bearer reconfiguration apparatus, refer to the method embodiments. Details are not described herein again.

Figure 8:
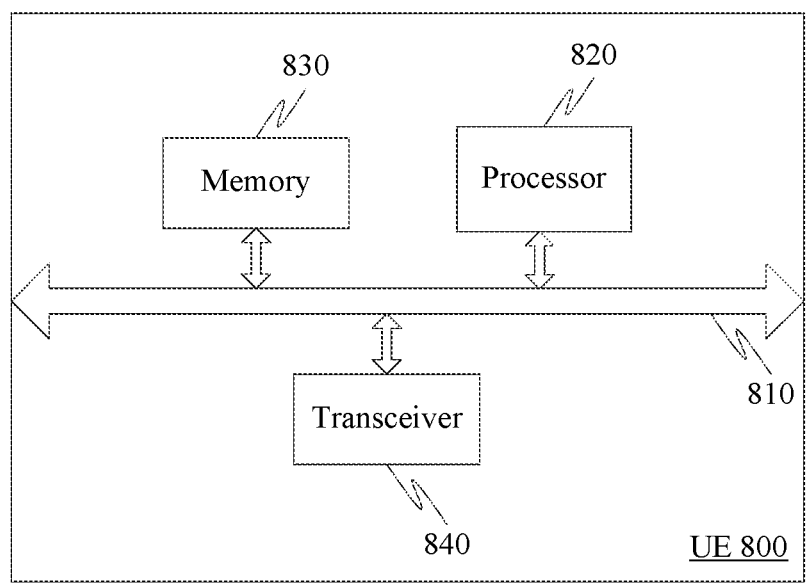
FIG. 8 is a structural block diagram of user equipment UE according to an embodiment of the present disclosure.

Referring to FIG. 8, FIG. 8 is a structural block diagram of user equipment UE provided in an embodiment of the present disclosure. As shown in FIG. 8, UE 800 includes: a bus 810 and a processor 820, a memory 830, and a transceiver 840 that communicate by using the bus 810. The memory 830 is configured to store one or more instructions, and the instructions are configured to be executed by the processor 820.

The processor 820 is configured to control the transceiver 840 to receive a radio bearer reconfiguration indication sent by a base station, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The processor 820 is further configured to release the target radio bearer.

The processor 820 is further configured to transmit signaling and/or data on the corresponding target radio bearer according to the target configuration parameter.

In conclusion, for the UE provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between the UE and a base station in a related technology is resolved. Used signaling resources are reduced and signaling overheads are reduced.

In addition, in a process of reconfiguration, the UE releases only a target radio bearer that needs to be reconfigured, but does not release another radio bearer that does not need to be reconfigured, so that during reconfiguration of an RB or some RBs, normal working of another RB is not affected, and at the same time an effect of reducing operations of the UE may further be achieved.

In an optional embodiment provided based on the embodiment shown in FIG. 8, the radio bearer reconfiguration indication further includes a full configuration identifier; and The processor 820 is specifically configured to release the target radio bearer according to the full configuration identifier.

In an optional embodiment provided based on the embodiment shown in FIG. 8,

The processor 820 is specifically configured to clear, from an original configuration parameter corresponding to the target radio bearer by releasing a protocol entity of the target radio bearer, an original configuration parameter corresponding to the target configuration parameter.

The protocol entity includes a packet data convergence protocol PDCP layer entity and/or a radio link control RLC layer entity.

In an optional embodiment provided based on the embodiment shown in FIG. 8, the processor 820 is specifically configured to: if the target configuration parameter is configuration parameters of all items corresponding to the target radio bearer, clear, by the UE, original configuration parameters of all the items corresponding to the target radio bearer; or the processor 820 is specifically configured to: if the target configuration parameter is configuration parameters of some items corresponding to the target radio bearer, clear, by the UE from the original configuration parameter corresponding to the target radio bearer, original configuration parameters of some items corresponding to the target configuration parameter, and reserve original configuration parameters of some other unchanged items.

In an optional embodiment provided based on the embodiment shown in FIG. 8, the processor 820 is further configured to: before the UE releases the target radio bearer, reestablish a protocol entity of the target radio bearer, to process a data packet that is temporarily not completely processed, where the protocol entity includes the PDCP layer entity and/or the RLC layer entity.

In an optional embodiment provided based on the embodiment shown in FIG. 8, the processor 820 is specifically configured to deliver, by using the PDCP layer entity of the target radio bearer to an upper-layer entity of a PDCP layer, a data packet that meets a first predetermined condition, where the data packet that meets the first predetermined condition refers to data packets that are temporarily not delivered to the upper-layer entity by the PDCP layer entity and that have consecutive data packet sequence numbers; and/or the processor 820 is specifically configured to deliver, by using the RLC layer entity of the target radio bearer to the PDCP layer entity, a data packet that meets a second predetermined condition, where the data packet that meets the second predetermined condition refers to a data packet that is temporarily not delivered to the PDCP layer entity by the RLC layer entity and that may be reassembled by the RLC layer entity.

In an optional embodiment provided based on the embodiment shown in FIG. 8, the processor 820 is specifically configured to reestablish the protocol entity of the target radio bearer according to the full configuration identifier in the radio bearer reconfiguration indication; or, the radio bearer reconfiguration indication further includes a reestablishment identifier, and the processor 820 is specifically configured to reestablish the protocol entity of the target radio bearer according to the reestablishment identifier.

In an optional embodiment provided based on the embodiment shown in FIG. 8, the processor 820 is specifically configured to: if the target configuration parameter is configuration parameters of all items corresponding to the target radio bearer, transmit, by the UE, signaling and/or data on the corresponding target radio bearer according to the target configuration parameter; or the processor 820 is specifically configured to: if the target configuration parameter is configuration parameters of some items corresponding to the target radio bearer, transmit, by the UE, signaling and/or data on the corresponding target radio bearer according to the target configuration parameter and original configuration parameters of some other unchanged items corresponding to the target radio bearer.

In an optional embodiment provided based on the embodiment shown in FIG. 8, the radio bearer reconfiguration indication is a radio resource control RRC connection reconfiguration message; or, the radio bearer reconfiguration indication is a control protocol data unit PDU.

In addition, for the UE provided in this embodiment, the UE clears, from an original configuration parameter corresponding to a target radio bearer, an original configuration parameter corresponding to a target configuration parameter, so that a problem such as a failure to read data because configuration parameters used by the UE and a base station when the UE and the base station transmit signaling and/or data are not synchronous can be avoided.

In addition, before releasing a protocol entity of a target radio bearer, the UE further processes, by reestablishing the protocol entity of the target radio bearer, a data packet that is temporarily not completely processed, so that a data packet loss can be avoided or reduced.

Figure 9:
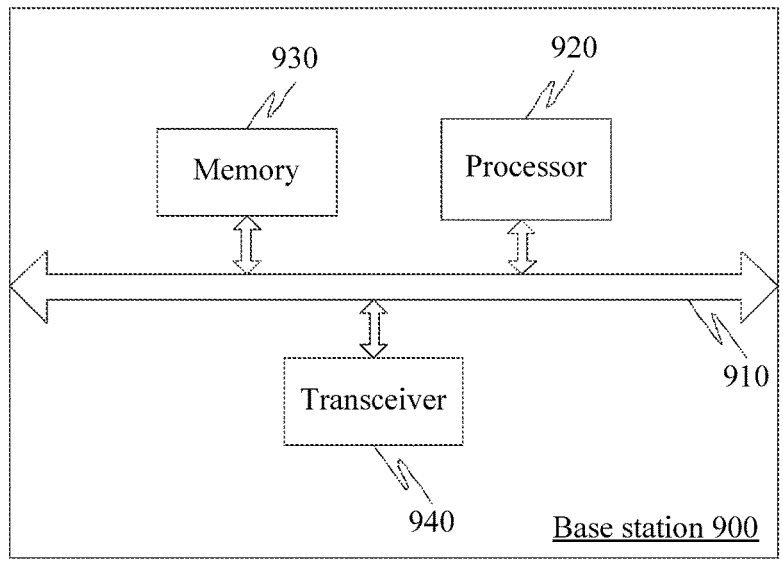
FIG. 9 is a structural block diagram of a base station according to an embodiment of the present disclosure.

Referring to FIG. 9, FIG. 9 is a structural block diagram of a base station provided in an embodiment of the present disclosure. As shown in FIG. 9, a base station 900 includes: a bus 910 and a processor 920, a memory 930, and a transceiver 940 that communicate by using the bus 910. The memory 930 is configured to store one or more instructions, and the instructions are configured to be executed by the processor 920.

The processor 920 is configured to generate a radio bearer reconfiguration indication, where the radio bearer reconfiguration indication includes a radio bearer identifier and a target configuration parameter, the radio bearer identifier indicates a target radio bearer that needs to be reconfigured, and the target configuration parameter corresponds to a configuration item of the target radio bearer that needs to be reconfigured.

The processor 920 is further configured to control the transceiver 940 to send the radio bearer reconfiguration indication to user equipment UE.

In conclusion, for the base station provided in this embodiment, a radio bearer reconfiguration indication includes a radio bearer identifier and a target configuration parameter that correspond to a target radio bearer that needs to be reconfigured, but does not include a radio bearer identifier and an original configuration parameter that correspond to another radio bearer that does not need to be reconfigured. Therefore, a problem of using excessive signaling resources during reconfiguration of an RB established between UE and the base station in a related technology is resolved. Used signaling resources are reduced and signaling overheads are reduced.

In an optional embodiment provided based on the embodiment shown in FIG. 9, the processor 920 is specifically configured to generate a first radio bearer reconfiguration indication, where the first radio bearer reconfiguration indication includes a radio bearer identifier corresponding to the target radio bearer and reconfigured configuration parameters of all items corresponding to the target radio bearer; or the processor 920 is specifically configured to generate a second radio bearer reconfiguration indication, where the second radio bearer reconfiguration indication includes a radio bearer identifier corresponding to the target radio bearer, reconfigured configuration parameters of some items corresponding to the target radio bearer, and original configuration parameters of some other unchanged items corresponding to the target radio bearer; or the processor 920 is specifically configured to generate a third radio bearer reconfiguration indication, where the third radio bearer reconfiguration indication includes a radio bearer identifier corresponding to the target radio bearer and reconfigured configuration parameters of some items corresponding to the target radio bearer.

In an optional embodiment provided based on the embodiment shown in FIG. 9, the radio bearer reconfiguration indication is a radio resource control RRC connection reconfiguration message; or, the radio bearer reconfiguration indication is a control protocol data unit PDU.

In addition, for the base station provided in this embodiment, the base station generates the foregoing third radio bearer reconfiguration indication, so that signaling overheads can be further reduced.

Figure 10:
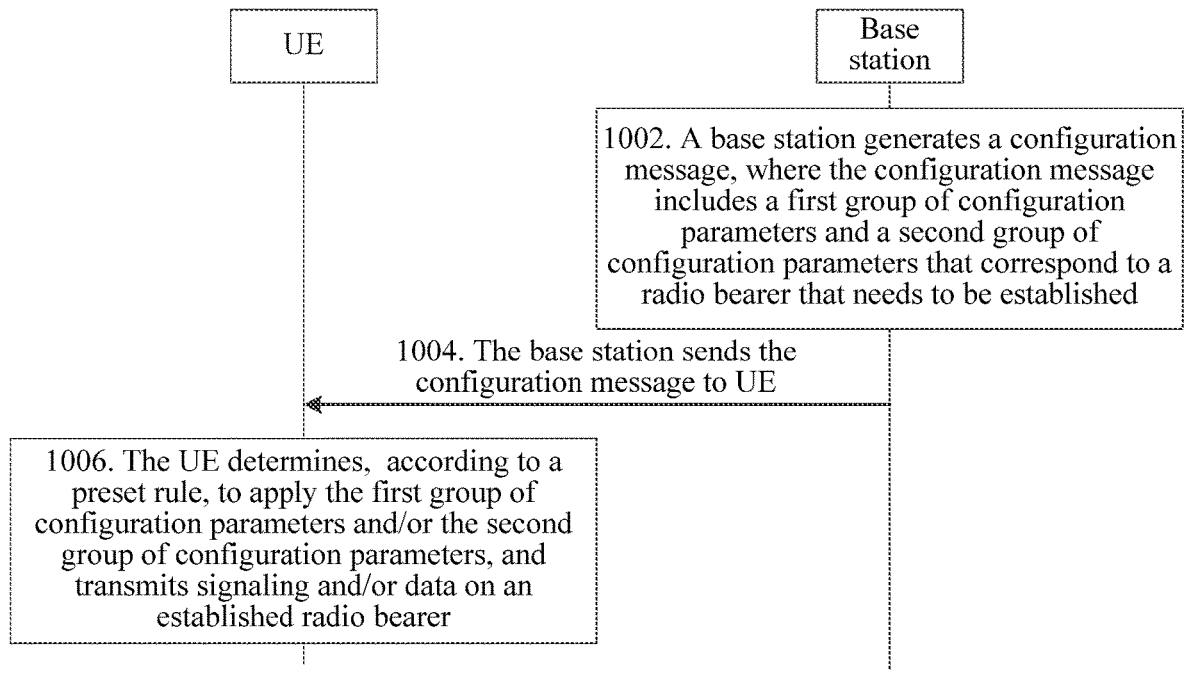
FIG. 10 is a method flowchart of a radio bearer establishment method according to an embodiment of the present disclosure.

Referring to FIG. 10, FIG. 10 is a method flowchart of a radio bearer establishment method provided in an embodiment of the present disclosure. This embodiment is described by using an example in which the radio bearer establishment method is applied to the implementation environment shown in FIG. 1. The radio bearer establishment method may include the following steps.

Step 1002: A base station generates a configuration message, where the configuration message includes a first group of configuration parameters and a second group of configuration parameters that correspond to a radio bearer that needs to be established.

Step 1004: The base station sends the configuration message to UE.

Correspondingly, the UE receives the configuration message sent by the base station.

Step 1006: The UE determines, according to a preset rule, to apply the first group of configuration parameters and/or the second group of configuration parameters, and transmits signaling and/or data on an established radio bearer.

A difference from the embodiments shown in FIG. 2 and FIG. 3 lies in that: in the embodiments shown in FIG. 2 and FIG. 3, a radio bearer reconfiguration indication is used to reconfiguration one or more established RBs. However, in this embodiment, the configuration message is used to establish one or more RBs, and the configuration message is usually an RRC connection reconfiguration message. An RB that needs to be established may be an SRB1, or may be an SRB2 or a DRB. This is not limited in this embodiment.

A difference from an existing RRC connection reconfiguration message used to establish an RB lies in that: the existing RRC connection reconfiguration message used to establish an RB carries only one group of configuration parameters. For example, when configuration parameters of all items corresponding to the RB that needs to be established include A1, B1, and C1, a first RRC connection reconfiguration message that carries A1, B1, and C1 is generated. The base station sends the first RRC connection reconfiguration message to the UE. The UE establishes an RB with the base station according to the first RRC connection reconfiguration message. Further, when the established RB needs to be reconfigured, assuming that a first original configuration parameter A1 is to be reconfigured and a reconfigured configuration parameter is A2, the base station generates a second RRC connection reconfiguration message that carries A2, B1, and C1. The base station sends the second RRC connection reconfiguration message to the UE. According to the second RRC connection reconfiguration message, the UE releases the previously established RB and reestablishes an RB.

In this embodiment, the configuration message used to establish an RB carries two groups of configuration parameters. In this way, when an RB needs to be reconfigured, the base station does not need to generate and send a second RRC connection reconfiguration message similar to the foregoing. When transmitting signaling and/or data by using an RB, the UE may select, according to a preset rule, the first group of configuration parameters and/or the second group of configuration parameters to be applied. For example, the base station may directly generate an RRC connection reconfiguration message that carries A1, A2, B1, and C1, and send the RRC connection reconfiguration message to the UE. Correspondingly, after receiving the RRC connection reconfiguration message, the UE establishes an RB with the base station. Subsequently, the UE determines, according to a preset rule, to apply the first group of configuration parameters A1, B1, and C1 and/or the second group of configuration parameters A2, B1, and C1, and transmits signaling and/or data on the established RB.

It should be noted that the foregoing step 1002 and step 1004 may be separately implemented as the radio bearer establishment method on a side of the base station, and the foregoing step 1004 to step 1006 may be separately implemented as the radio bearer establishment method on a side of the UE.

It should be further noted that before performing the foregoing step 1006, the UE may further establish a radio bearer with the base station according to the configuration message.

In conclusion, in the radio bearer establishment method provided in this embodiment, a configuration message used to establish a radio bearer simultaneously carries two groups of different configuration parameters, so that UE applies the different configuration parameters in different scenarios to improve an effect of data transmission. A manner of sending a message used to reconfigure a radio bearer to the UE does not need to be used to complete reconfiguration, so that signaling overheads can be further reduced, and at the same time an impact on another radio bearer can be reduced.

In the following, for example, a first group of configuration parameters includes a first configuration parameter, where the first configuration parameter carries time-length information of a first status-report prohibition timer; and a second group of configuration parameters includes a second configuration parameter, where the second configuration parameter carries time-length information of a second status-report prohibition timer. This example is used to describe application of different configuration parameter transmission status reports by the UE in different scenarios.

First, related concepts of a status report are introduced.

A status report is generated by a receive end of data, and is used to feed back, to a transmit end of data, whether a predefined data packet is correctly received. The status report may include: a first status report and a second status report.

The first status report is used to indicate that the receive end of data receives the predefined data packet correctly.

The second status report is used to indicate that at least one data packet of the predefined data packet is not correctly received.

In addition, before feeding back a status report to the transmit end of data, the receive end of data needs to detect whether a status-report prohibition timer is expired or is suspended. The status-report prohibition timer is used to limit a time interval between two successive times of sending a status report. If it is determined that the status-report prohibition timer is expired or is suspended, the receive end of data may then generate a status report and send the status report to the transmit end of data. If it is determined that the status-report prohibition timer is not expired or is not suspended, the receive end of data cannot send a status report.

In a data transmission mode in which the receive end needs to feedback a status report, for example, in an RLC AM mode, a maximum length of data that the transmit end can send one time is a length of one transmit window. When a length of data that the transmit end has sent reaches the length of the transmit window, if a status report that is to be fed back is not received, the transmit end cannot continue to send a data packet. When the status report that is fed back is received, the transmit window can slide forward, and the transmit end continues to send a data packet.

Therefore, a prohibition time length corresponding to the status-report prohibition timer affects a transmission rate of the transmit end. When the prohibition time length is excessively large, a speed at which the receive end feeds back a status report is excessively slow. As a result, the transmit end waits for an excessively long time, and the transmission rate does not reach a maximum value. When the prohibition time length is excessively small and is even 0, a speed at which the receive end feeds back a status report is very fast, which helps to increase a transmission rate, but the following cases may be caused. For a same data packet that is not correctly received, the receive end may feed back multiple second status reports, and consequently the transmit end unnecessarily retransmits the data packet multiple times, causing a waste of radio transmission resources.

Therefore, the receive end configures a suitable prohibition time length corresponding to a status-report prohibition timer, so that a transmission rate of a data packet may be increased in a case of relatively good transmission quality (that is, in a case in which a predefined data packet is correctly received), and in a case of relatively poor transmission quality (that is, in a case in which at least one data packet of the predefined data packet is not correctly received), feedback of multiple second status reports is avoided, and the transmit end is prevented from unnecessarily retransmitting, multiple times, a data packet that is not correctly received.

Figure 11:
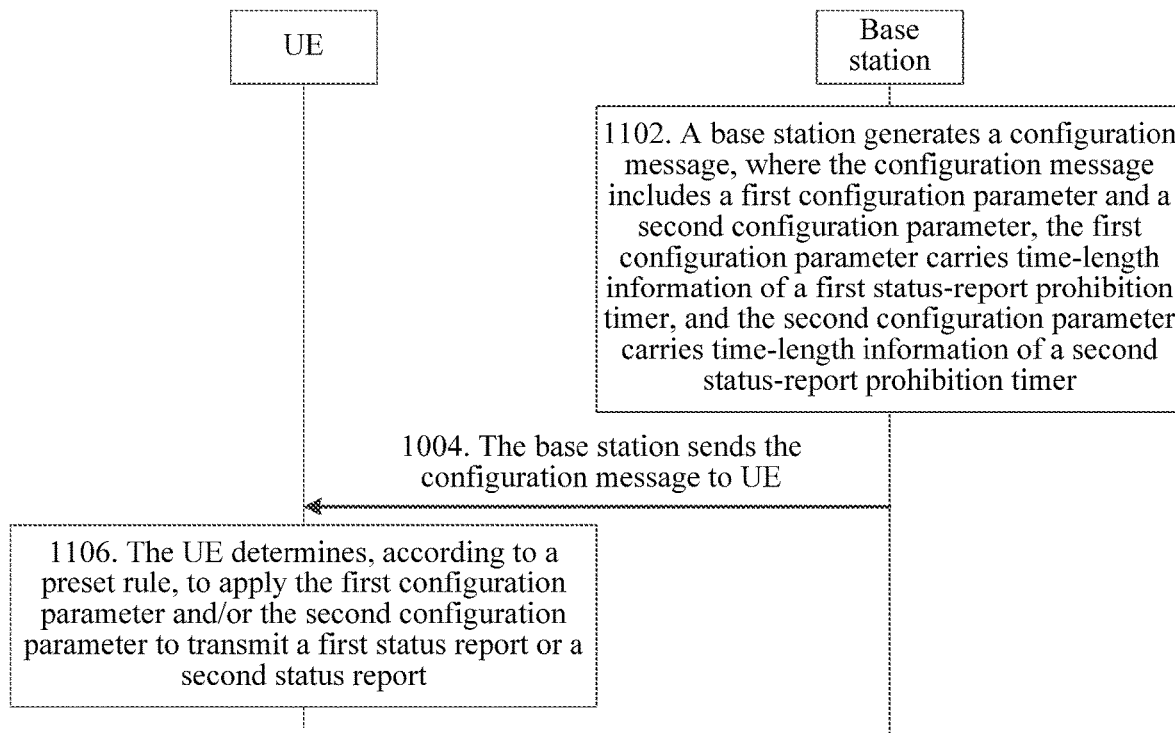
FIG. 11 is a method flowchart of a radio bearer establishment method according to another embodiment of the present disclosure.

Referring to FIG. 11, FIG. 11 is a method flowchart of a radio bearer establishment method provided in another embodiment of the present disclosure. This embodiment is described by using an example in which the radio bearer establishment method is applied to the implementation environment shown in FIG. 1. The radio bearer establishment method may include the following steps.

Step 1102: A base station generates a configuration message, where the configuration message includes a first configuration parameter and a second configuration parameter, the first configuration parameter carries time-length information of a first status-report prohibition timer, and the second configuration parameter carries time-length information of a second status-report prohibition timer.

Step 1104: The base station sends the configuration message to UE.

Correspondingly, the UE receives the configuration message sent by the base station.

Step 1106: The UE determines, according to a preset rule, to apply the first configuration parameter and/or the second configuration parameter to transmit a first status report or a second status report.

In conclusion, in the radio bearer establishment method provided in this embodiment, a configuration message used to establish a radio bearer simultaneously carries time length information of two different status-report prohibition timers, so that UE applies prohibition time lengths corresponding to the different status-report prohibition timers in different transmission environments, thereby improving an effect of data transmission.

In addition, a manner of sending a message used to reconfigure a radio bearer to UE does not need to be used to change a prohibition time length corresponding to a status-report prohibition timer, so that signaling overheads can be further reduced, and at the same time an interaction procedure between a base station and the UE is reduced.

In the following, for example, a first prohibition time length is less than a second prohibition time length. This example is used to describe several possible implementation manners used in the foregoing step 1106. The first prohibition time length corresponds to a time length corresponding to time-length information of a first status-report prohibition timer carried in the first configuration parameter, and the second prohibition time length corresponds to a time length corresponding to time-length information of a second status-report prohibition timer carried in the second configuration parameter.

First, differences between the several different implementation manners used in the foregoing step 1106 are briefly introduced by using the following Table-1:

TABLE 1

| Implementation manner | Condition of generating and sending a status report | Type of the status report to send | Timer set (or reset) after the status report is sent |
|---|---|---|---|
| 1 | T1 is expired or is suspended | First status report | T1 |
|   | T2 is expired or is suspended | Second status report | T2 |
| 2 | T1 is expired or is suspended | First status report | T1+T2 |
|   | T2 is expired or is suspended | Second status report | T1+T2 |
| 3 | T1 is expired or is suspended | First status report | T1 |
|   | T1 is expired or is suspended, and T2 is expired or is suspended | Second status report | T1+T2 |

T1 shows the first status-report prohibition timer, and T2 shows the second status-report prohibition timer.

When meeting a condition of determining to generate a status report, the UE determines to generate a first status report or a second status report. The condition of determining to generate a status report specifically may include that: the UE receives a polling indication that is sent by the base station and that is used to request a status report, or, the UE detects that a data packet is not correctly received. An RLC AM mode is used as an example. When the RLC layer entity of the UE receives a polling indication that is sent by the RLC layer entity of the base station and that is used to request a status report, or when the RLC layer entity of the UE detects that a data packet is not correctly received (that is, a resequencing timer is expired), the UE meets the condition of determining to generate a status report. In this case, the RLC layer entity of the UE determines to generate a first status report or a second status report. The first status report is used to indicate that the UE correctly receives the predefined data packet. The second status report is used to indicate that at least one data packet of the predefined data packet is not correctly received.

It should be noted that a type of the status report that the UE determines to generate may change with a change of an actual reception status of a data packet. For example, when the status report that the UE determines to generate is the first status report, after a period of time, the UE may change to determine to generate the second status report. Alternatively, when the status report that the UE determines to generate is the second status report, after a period of time, the UE may change to determine to generate the first status report. This is not limited in the present disclosure.

A first possible implementation manner of step 1106 includes the following two possible cases:

1. The UE determines that the first status-report prohibition timer is expired or is suspended, the UE sends the first status report to the base station, and the UE sets the first status-report prohibition timer to the first prohibition time length.

In this implementation manner, the first status-report prohibition timer is used to limit a time interval between a first status report and a first status report that is sent a previous time. That is, the first status-report prohibition timer is used to limit a time interval between two successive times of sending a first status report.

When the first status-report prohibition timer is expired or is suspended, it indicates that the UE may send a status report. In this case, when obtaining, from the RLC layer entity of the UE, a transmission indication sent by a bottom layer (that is, a MAC layer), the UE generates a first status report and sends the first status report to the base station, and sets the first status-report prohibition timer to the first prohibition time length. To send the first status report to the base station as soon as possible, after the first status-report prohibition timer is expired or is suspended, when the RLC layer entity of the UE obtains a first transmission indication sent by the bottom layer (that is, the MAC layer), the UE generates a first status report and sends the first status report to the base station.

The RLC AM mode is used as an example. When the first status-report prohibition timer is expired or is suspended, the RLC layer entity generates a first status report according to an obtained transmission indication sent by a bottom layer (that is, a MAC layer), and sends the first status report to the bottom layer, so that the bottom layer sends the first status report to the base station. At the same time, the RLC layer entity sets the first status-report prohibition timer to the first prohibition time length.

In this implementation manner, when sending the first status report to the base station, the UE sets the first status-report prohibition timer to the first prohibition time length, that is, starts the status-report prohibition timer with a relatively small prohibition time length, so as to increase a transmission rate of a data packet in a case of relatively good transmission quality (that is, in a case in which a predefined data packet is correctly received).

2. The UE determines that the second status-report prohibition timer is expired or is suspended, the UE sends the second status report to the base station, and the UE sets the second status-report prohibition timer to the second prohibition time length.

In this implementation manner, the second status-report prohibition timer is used to limit a time interval between a second status report and a second status report that is sent a previous time. That is, the second status-report prohibition timer is used to limit a time interval between two consecutive times of sending a second status report.

When the second status-report prohibition timer is expired or is suspended, it indicates that the UE may send a status report. In this case, when the RLC layer entity of the UE obtains a transmission indication sent by a bottom layer (that is, a MAC layer), the UE generates a second status report and sends the second status report to the base station, and sets the second status-report prohibition timer to the second prohibition time length. To send the second status report to the base station as soon as possible, after the second status-report prohibition timer is expired or is not running, when the RLC layer entity of the UE obtains a first transmission indication sent by the bottom layer (that is, the MAC layer), the UE generates a second status report and sends the second status report to the base station.

The RLC AM mode is used as an example. When the second status-report prohibition timer is expired or is suspended, the RLC layer entity generates a second status report according to an obtained transmission indication sent by a bottom layer (that is, a MAC layer), and sends the second status report to the bottom layer, so that the bottom layer sends the second status report to the base station. At the same time, the RLC layer entity sets the second status-report prohibition timer to the second prohibition time length.

In this implementation manner, when sending the second status report to the base station, the UE sets the second status-report prohibition timer to the second prohibition time length, that is, starts the status-report prohibition timer with a relatively large prohibition time length, so that in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources.

In conclusion, in the first possible implementation manner of step 1106, when sending the first status report to the base station, the UE sets the first status-report prohibition timer to the first prohibition time length, that is, starts the status-report prohibition timer with a relatively small prohibition time length, so that a transmission rate of a data packet is increased in a case of relatively good transmission quality (that is, in a case in which a predefined data packet is correctly received). When sending the second status report to the base station, the UE sets the second status-report prohibition timer to the second prohibition time length, that is, starts the status-report prohibition timer with a relatively large prohibition time length, so that in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources.

A second possible implementation manner of step 1106 includes the following two possible cases:

1. The UE determines that the first status-report prohibition timer is expired or is suspended, the UE sends the first status report to the base station, and the UE sets the first status-report prohibition timer to the first prohibition time length, and sets the second status-report prohibition timer to the second prohibition time length.

In this implementation manner, the first status-report prohibition timer is used to limit a time interval between a first status report and a first status report that is sent a previous time. That is, the first status-report prohibition timer is used to limit a time interval between two consecutive times of sending a first status report.

When the first status-report prohibition timer is expired or is suspended, it indicates that the UE may send a status report. In this case, the UE generates a first status report and sends the first status report to the base station. Moreover, the UE sets the first status-report prohibition timer to the first prohibition time length, and sets the second status-report prohibition timer to the second prohibition time length. To send the first status report to the base station as soon as possible, after the first status-report prohibition timer is expired or is suspended, when the RLC layer entity of the UE obtains a first transmission indication sent by a bottom layer (that is, a MAC layer), the UE generates a first status report and sends the first status report to the base station.

A difference from the foregoing first possible implementation manner lies in that: In the second possible implementation manner, when sending the first status report to the base station, the UE sets the first status-report prohibition timer to the first prohibition time length, and also sets the second status-report prohibition timer to the second prohibition time length at the same time. The second status-report prohibition timer is used to limit a time interval between a second status report and a second status report that is sent a previous time. That is, the second status-report prohibition timer is used to limit a time interval between two consecutive times of sending a second status report.

When sending the first status report, the UE cannot predict whether a next status report should be the first status report or the second status report. Therefore, to prevent a case in which after the UE sends the first status report, if a next status report is a second status report, the UE directly sends the second status report (that is, a case in which a time interval between sequential sending of the first status report and the second status report is not limited). When sending the first status report, the UE starts the two status-report prohibition timers at the same time. The first status-report prohibition timer is used to limit a time of sending a first status report a next time, and the second status-report prohibition timer is used to limit a time of sending a second status report a next time.

An RLC AM mode is used as an example. When the first status-report prohibition timer is expired or is suspended, the RLC layer entity generates a first status report according to an obtained transmission indication sent by a bottom layer (that is, the MAC layer), and sends the first status report to the bottom layer, so that the bottom layer sends the first status report to the base station. At the same time, the RLC layer entity sets the first status-report prohibition timer to the first prohibition time length, and sets the second status-report prohibition timer to the second prohibition time length.

In this implementation manner, a technical effect of the foregoing first possible implementation manner is achieved, that is, a transmission rate of a data packet is increased in a case of relatively good transmission quality (that is, in a case in which a predefined data packet is correctly received). At the same time, the second status-report prohibition timer is further set to the second prohibition time length at the same time, so as to prevent a case in which a time interval between sequential sending of the first status report and the second status report is not limited.

2. The UE determines that the second status-report prohibition timer is expired or is suspended, the UE sends the second status report to the base station, and the UE sets the second status-report prohibition timer to the second prohibition time length, and sets the first status-report prohibition timer to the first prohibition time length.

As introduced above, in this implementation manner, the second status-report prohibition timer is used to limit a time interval between a second status report and a second status report that is sent a previous time. That is, the second status-report prohibition timer is used to limit a time interval between two consecutive times of sending a second status report.

When the second status-report prohibition timer is expired or is suspended, it indicates that the UE may send a status report. In this case, the UE generates a second status report and sends the second status report to the base station. Moreover, the UE sets the second status-report prohibition timer to the second prohibition time length, and sets the first status-report prohibition timer to the first prohibition time length. To send the second status report to the base station as soon as possible, after the second status-report prohibition timer is expired or is not running, when the RLC layer entity of the UE obtains a first transmission indication sent by a bottom layer (that is, a MAC layer), the UE generates a second status report and sends the second status report to the base station.

A difference from the foregoing first possible implementation manner lies in that: in the second possible implementation manner, when sending the second status report to the base station, the UE sets the second status-report prohibition timer to the second prohibition time length, and sets the first status-report prohibition timer to the first prohibition time length at the same time.

When sending the second status report, the UE cannot predict whether a next status report should be the first status report or the second status report. Therefore, to prevent a case in which after the UE sends the second status report, if a next status report is a first status report, the UE directly sends the first status report (that is, a case in which a time interval between sequential sending of the second status report and the first status report is not limited). When sending the second status report, the UE starts the two status-report prohibition timers at the same time. The second status-report prohibition timer is used to limit a time of sending a second status report a next time, and the first status-report prohibition timer is used to limit a time of sending a first status report a next time.

The RLC AM mode is used as an example. When the second status-report prohibition timer is expired or is suspended, the RLC layer entity generates a second status report according to an obtained transmission indication sent by a bottom layer (that is, a MAC layer), and sends the second status report to the bottom layer, so that the bottom layer sends the second status report to the base station. At the same time, the RLC layer entity sets the second status-report prohibition timer to the second prohibition time length, and sets the first status-report prohibition timer to the first prohibition time length.

In this implementation manner, a technical effect of the foregoing first possible implementation manner is achieved, that is, in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources. At the same time, the first status-report prohibition timer is further set to the first prohibition time length at the same time, thereby preventing a case in which a time interval between sequential sending of the second status report and the first status report is not limited.

In conclusion, in the second possible implementation manner of step 1106, a technical effect of the foregoing first possible implementation manner is achieved. At the same time, when the status report is being sent, the first status-report prohibition timer is further set to the first prohibition time length, and the second status-report prohibition timer is set to the second prohibition time length, that is, two status-report prohibition timers are started at the same time, so as to prevent a case in which a time interval between sequential sending of two different types of status reports is not limited, so that a time interval between sequential sending of any two status reports can be controlled.

In a third possible implementation manner of step 1106, the following two possible cases are included:

1. The UE determines that the first status-report prohibition timer is expired or is suspended, the UE sends the first status report to the base station, and the UE sets the first status-report prohibition timer to the first prohibition time length.

A difference from the foregoing first and second possible implementation manners lies in that: in the third possible implementation manner, the first status-report prohibition timer is used to limit a time interval between a first status report and a first status report that is sent a previous time. That is, the first status-report prohibition timer is used to limit a time interval between two consecutive times of sending a first status report. The first status-report prohibition timer is further configured to limit a time interval between a first status report and a second status report that is sent a previous time. That is, the first status-report prohibition timer is further configured to limit a time interval between two consecutive and sequential times of sending a second status report and a first status report. The first status-report prohibition timer is further configured to limit a time interval between a second status report and a first status report that is sent a previous time. That is, the first status-report prohibition timer is further configured to limit a time interval between two consecutive and sequential times of sending a first status report and a second status report.

When the first status-report prohibition timer is expired or is suspended, it indicates that the UE may send a status report. In this case, the UE generates a first status report and sends the first status report to the base station, and sets the first status-report prohibition timer to the first prohibition time length. To send the first status report to the base station as soon as possible, after the first status-report prohibition timer is expired or is suspended, when the RLC layer entity of the UE obtains a first transmission indication sent by a bottom layer (that is, a MAC layer), the UE generates a first status report and sends the first status report to the base station.

A difference from the foregoing second possible implementation manner lies in that: in the third possible implementation manner, when sending the first status report to the base station, the UE sets only the first status-report prohibition timer to the first prohibition time length, that is, starts only the first status-report prohibition timer. According to the function of the first status-report prohibition timer introduced above in this implementation manner, the UE may limit, by using the first status-report prohibition timer, a time interval between two consecutive times of sending a first status report, a time interval between two consecutive and sequential times of sending a first status report and a second status report, and a time interval between two consecutive and sequential times of sending a second status report and a first status report, thereby achieving a technical effect of the foregoing first and second possible implementation manners.

Compared with the foregoing second possible implementation manner, in the second possible implementation manner, when sending the first status report to the base station, the UE sets the second status-report prohibition timer to the second prohibition time length, resulting in a relatively long time interval between two consecutive and sequential times of sending a first status report and a second status report. However, the foregoing relatively high time consumption is unnecessary. The reason is that a first second status report after a first status report does not cause misunderstanding by the base station, and the first second status report after the first status report may be fed back relatively rapidly, thereby increasing a retransmission response speed of the base station. Therefore, in this implementation manner, when generating a first status report and sends the first status report to the base station, the UE sets only the first status-report prohibition timer to the first prohibition time length. Moreover, the first status-report prohibition timer controls a time of sending a next status report (the next status report may be a first status report, or may be a second status report). Therefore, technical effects of the foregoing first and second possible implementation manners are achieved, and at the same time, a time interval between two consecutive and sequential times of sending a first status report and a second status report is further shortened, thereby increasing a retransmission response speed of the base station.

The RLC AM mode is used as an example. When the first status-report prohibition timer is expired or is suspended, the RLC layer entity generates a first status report according to an obtained transmission indication sent by a bottom layer (that is, a MAC layer), and sends the first status report to the bottom layer, so that the bottom layer sends the first status report to the base station. At the same time, the RLC layer entity sets the first status-report prohibition timer to the first prohibition time length.

2. The UE determines that the first status-report prohibition timer is expired or is suspended and that the second status-report prohibition timer is also expired or is suspended. The UE sends the second status report to the base station. The UE sets the first status-report prohibition timer to the first prohibition time length, and sets the second status-report prohibition timer to the second prohibition time length.

In this implementation manner, the second status-report prohibition timer is used to limit a time interval between a second status report and a second status report that is sent a previous time. That is, the second status-report prohibition timer is used to limit a time interval between two consecutive times of sending a second status report. The first status-report prohibition timer is further configured to limit a time interval between a second status report and a first status report that is sent a previous time. That is, the first status-report prohibition timer is further configured to limit a time interval between two consecutive and sequential times of sending a first status report and a second status report. Therefore, in a case of determining to generate a second status report, the UE needs to detect whether the first status-report prohibition timer is expired or is suspended, and at the same time further needs to detect whether the second status-report prohibition timer is expired or is suspended.

When the UE determines that the first status-report prohibition timer is expired or is suspended and that the second status-report prohibition timer is also expired or is suspended, it indicates that the UE may send the second status report. In this case, the UE generates a second status report and sends the second status report to the base station. At the same time, the UE sets the first status-report prohibition timer to the first prohibition time length, and sets the second status-report prohibition timer to the second prohibition time length, that is, starts two status-report prohibition timers at the same time. To send the second status report to the base station as soon as possible, when the UE determines that the first status-report prohibition timer is expired or is suspended and that the second status-report prohibition timer is also expired or is suspended, when the RLC layer entity of the UE obtains a first transmission indication sent by a bottom layer (that is, a MAC layer), the UE generates a second status report and sends the second status report to the base station.

In this implementation manner, when sending the second status report to the base station, the UE sets the second status-report prohibition timer to the second prohibition time length. The second status-report prohibition timer is used to limit a time interval between two consecutive times of sending a second status report, thereby implementing that in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources.

At the same time, when sending the second status report to the base station, the UE further sets the first status-report prohibition timer to the first prohibition time length. The first status-report prohibition timer is used to limit a time interval between consecutive and sequential sending of a second status report and a first status report, thereby preventing a case in which the time interval between consecutive and sequential sending of a second status report and a first status report is not limited.

The RLC AM mode is used as an example. When the first status-report prohibition timer is expired or is suspended, and the second status-report prohibition timer is also expired or is suspended, the RLC layer entity generates a second status report according to an obtained transmission indication sent by a bottom layer (that is, a MAC layer), and sends the second status report to the bottom layer, so that the bottom layer sends the second status report to the base station. At the same time, the UE sets the first status-report prohibition timer to the first prohibition time length, and sets the second status-report prohibition timer to the second prohibition time length.

In conclusion, in the third possible implementation manner of step 1106, a technical effect of the foregoing first and second possible implementation manners is achieved. At the same time, a time interval between two consecutive and sequential times of sending a first status report and a second status report is further shortened, thereby increasing a retransmission response speed of the base station.

It may be understood that related operations on a side of UE in the foregoing three implementation manners may be used on a side of the base station. That is, when the UE is used as a transmit end of data and the base station is used as a receive end of data, the base station may use, according to any implementation manner in the foregoing, the first status-report prohibition timer and/or the second status-report prohibition timer to limit a time interval between sending of different status reports to the UE, and after the different status reports are sent to the UE, the first prohibition time length and/or the second prohibition time length are set. This is not limited in the present disclosure.

Apparatus embodiments corresponding to the foregoing method embodiments are provided below. For details that are not disclosed in the apparatus embodiments, reference may be made to the foregoing method embodiments.

Figure 12:
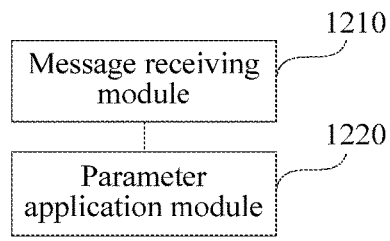
FIG. 12 is a structural block diagram of a radio bearer establishment apparatus according to an embodiment of the present disclosure.

Referring to FIG. 12, FIG. 12 is a structural block diagram of a radio bearer establishment apparatus provided in an embodiment of the present disclosure. The radio bearer establishment apparatus may be implemented as a part of the UE or the entire UE in the implementation environment shown in FIG. 1 by using software, hardware or a combination of software and hardware. The radio bearer establishment apparatus may include: a message receiving module 1210 and a parameter application module 1220.

The message receiving module 1210 is configured to receive a configuration message sent by a base station, where the configuration message includes a first group of configuration parameters and a second group of configuration parameters that correspond to a radio bearer that needs to be established.

The parameter application module 1220 is configured to determine, according to a preset rule, to apply a first group of configuration parameters and/or a second group of configuration parameters, and transmit signaling and/or data on an established radio bearer.

In conclusion, for the radio bearer establishment apparatus provided in this embodiment, a configuration message used to establish a radio bearer simultaneously carries two groups of different configuration parameters, so that UE applies the different configuration parameters in different scenarios to improve an effect of data transmission, and a manner of sending a message used to reconfigure a radio bearer to the UE does not need to be used to complete reconfiguration. Therefore, signaling overheads can be further reduced, and at the same time an impact on another radio bearer can be reduced.

Figure 13:
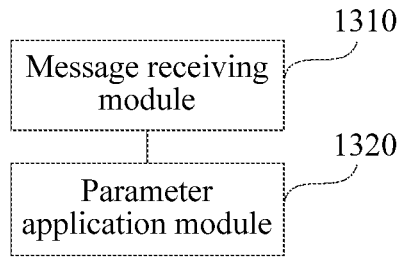
FIG. 13 is a structural block diagram of a radio bearer establishment apparatus according to another embodiment of the present disclosure.

Referring to FIG. 13, FIG. 13 is a structural block diagram of a radio bearer establishment apparatus provided in another embodiment of the present disclosure. The radio bearer establishment apparatus may be implemented as a part of the UE or the entire UE in the implementation environment shown in FIG. 1 by using software, hardware or a combination of software and hardware. The radio bearer establishment apparatus may include: a message receiving module 1310 and a parameter application module 1320.

The message receiving module 1310 is configured to receive a configuration message sent by a base station, where the configuration message includes a first configuration parameter and a second configuration parameter, the first configuration parameter carries time-length information of a first status-report prohibition timer, and the second configuration parameter carries time-length information of a second status-report prohibition timer.

The parameter application module 1320 is configured to determine, according to a preset rule, to apply the first configuration parameter and/or the second configuration parameter to transmit a first status report or a second status report.

In conclusion, for the radio bearer establishment apparatus provided in this embodiment, a configuration message used to establish a radio bearer simultaneously carries time length information of two different status-report prohibition timers, so that UE applies prohibition time lengths corresponding to different status-report prohibition timers in different transmission environments, thereby improving an effect of data transmission.

In addition, a manner of sending a message used to reconfigure a radio bearer to UE does not need to be used to change a prohibition time length corresponding to a status-report prohibition timer, so that signaling overheads can be further reduced, and at the same time an interaction procedure between a base station and the UE is reduced.

In an optional embodiment provided based on the embodiment shown in FIG. 13, the first status report is used to indicate that the UE correctly receives a predefined data packet, and the second status report is used to indicate that at least one data packet of the redefined data packet is not correctly received.

A first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

Figure 14A:
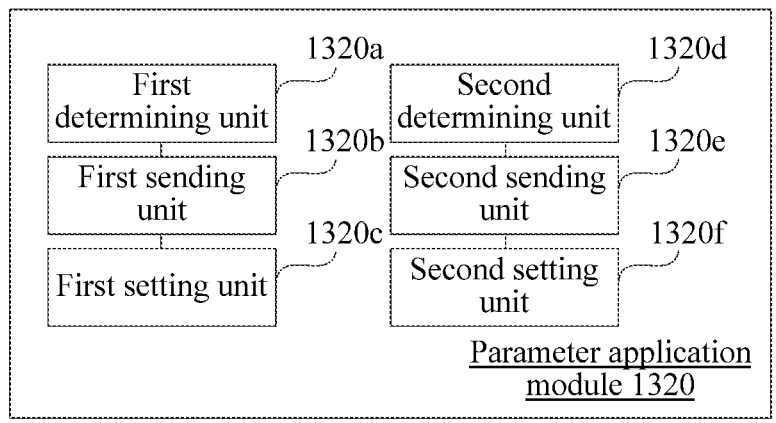
FIG. 14A is a structural block diagram of a parameter application module 1220 used in the radio bearer establishment apparatus according to the another embodiment of the present disclosure.

In an optional embodiment provided based on the embodiment shown in FIG. 13, as shown in FIG. 14A, the parameter application module 1320 includes: a first determining unit 1320a, a first sending unit 1320b, and a first setting unit 1320c.

The first determining unit 1320a is configured to determine that the first status-report prohibition timer is expired or is suspended; the first sending unit 1320b is configured to send the first status report to the base station; and the first setting unit 1300c is configured to set the first status-report prohibition timer to the first prohibition time length.

Alternatively, the parameter application module 1320 includes: a second determining unit 1320d, a second sending unit 1320e, and a second setting unit 1320f.

The second determining unit 1320d is configured to determine that the second status-report prohibition timer is expired or is suspended; the second sending unit 1320e is configured to send the second status report to the base station; and the second setting unit 1320f is configured to set the second status-report prohibition timer to the second prohibition time length.

In conclusion, when sending the first status report to the base station, the UE sets the first status-report prohibition timer to the first prohibition time length, that is, starts the status-report prohibition timer with a relatively small prohibition time length, so that a transmission rate of a data packet is increased in a case of relatively good transmission quality (that is, in a case in which a predefined data packet is correctly received). When sending the second status report to the base station, the UE sets the second status-report prohibition timer to the second prohibition time length, that is, starts the status-report prohibition timer with a relatively large prohibition time length, so that in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources.

Figure 14B:
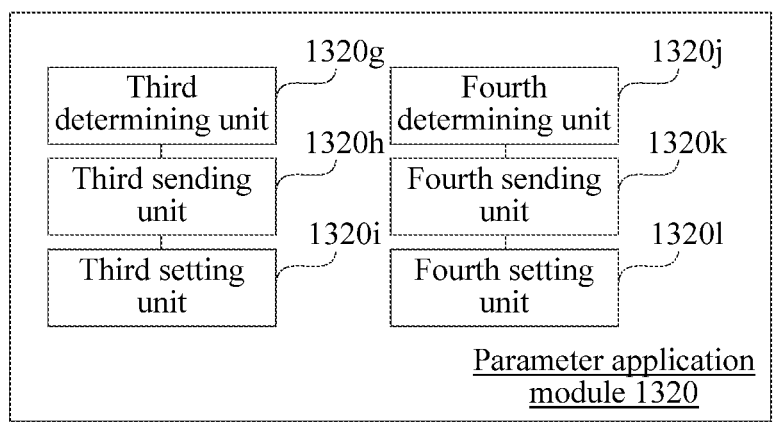
FIG. 14B is a structural block diagram of another parameter application module 1220 used in the radio bearer establishment apparatus according to the another embodiment of the present disclosure.

In an optional embodiment provided based on the embodiment shown in FIG. 13, as shown in FIG. 14B, the parameter application module 1320 includes: a third determining unit 1320g, a third sending unit 1320h, and a third setting unit 1320i.

The third determining unit 1320g is configured to determine that the first status-report prohibition timer is expired or is suspended; the third sending unit 1320h is configured to send the first status report to the base station; and the third setting unit 1320i is configured to: set the first status-report prohibition timer to the first prohibition time length, and set the second status-report prohibition timer to the second prohibition time length.

Alternatively, the parameter application module 1320 includes: a fourth determining unit 1320j, a fourth sending unit 1320k, and a fourth setting unit 1320l.

The fourth determining unit 1320j is configured to determine that the second status-report prohibition timer is expired or is suspended; the fourth sending unit 1320k is configured to send the second status report to the base station; and the fourth setting unit 1320l is configured to: set the second status-report prohibition timer to the second prohibition time length, and set the first status-report prohibition timer to the first prohibition time length.

In conclusion, this embodiment achieves the technical effect of the embodiment shown in the foregoing FIG. 14A, and at the same time when a status report is being sent, the first status-report prohibition timer is further set to the first prohibition time length, and the second status-report prohibition timer is further set to the second prohibition time length, that is, two status-report prohibition timers are started at the same time, thereby preventing a case in which a time interval between consecutive sending of two different types of status reports is not limited, so that a time interval between consecutive sending of any two status reports can be controlled.

Figure 14C:
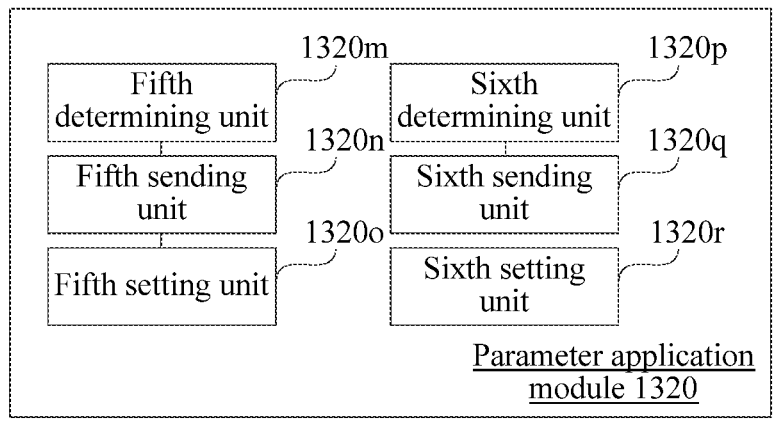
FIG. 14C is a structural block diagram of another parameter application module 1220 used in the radio bearer establishment apparatus according to another embodiment of the present disclosure.

In an optional embodiment provided based on the embodiment shown in FIG. 13, as shown in FIG. 14C, the parameter application module 1320 includes: a fifth determining unit 1320m, a fifth sending unit 1320n, and a fifth setting unit 1320o.

The fifth determining unit 1320m is configured to determine that the first status-report prohibition timer is expired or is suspended; the fifth sending unit 1320n is configured to send the first status report to the base station; and the fifth setting unit 1320o is configured to set the first status-report prohibition timer to the first prohibition time length.

Alternatively, the parameter application module 1320 includes: a sixth determining unit 1320p, a sixth sending unit 1320q, and a sixth setting unit 1320r.

The sixth determining unit 1320p is configured to determine that the first status-report prohibition timer is expired or is suspended and that the second status-report prohibition timer is also expired or is suspended; the sixth sending unit 1320q is configured to send the second status report to the base station; and the sixth setting unit 1320r is configured to: set the first status-report prohibition timer to the first prohibition time length, and set the second status-report prohibition timer to the second prohibition time length.

In conclusion, this embodiment achieves technical effects of the embodiments shown in FIG. 14A and FIG. 14B in the foregoing, and at the same time, a time interval between two consecutive and sequential times of sending a first status report and a second status report is further shortened, thereby increasing a retransmission response speed of a base station.

Figure 15:
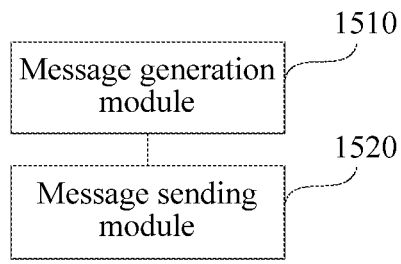
FIG. 15 is a structural block diagram of a radio bearer establishment apparatus according to another embodiment of the present disclosure.

Referring to FIG. 15, FIG. 15 is a structural block diagram of a radio bearer establishment apparatus provided in another embodiment of the present disclosure. The radio bearer establishment apparatus may be implemented as a part of the base station or the entire base station in the implementation environment shown in FIG. 1 by using software, hardware or a combination of software and hardware. The radio bearer establishment apparatus may include: a message generation module 1510 and a message sending module 1520.

The message generation module 1510 is configured to generate a configuration message, where the configuration message includes a first group of configuration parameters and a second group of configuration parameters that correspond to a radio bearer that needs to be established.

The message sending module 1520 is configured to send the configuration message to UE.

In conclusion, for the radio bearer establishment apparatus provided in this embodiment, a configuration message used to establish a radio bearer simultaneously carries two groups of different configuration parameters, so that UE applies the different configuration parameters in different scenarios to improve an effect of data transmission, and a manner of sending a message used to reconfigure a radio bearer to the UE does not need to be used to complete reconfiguration. Therefore, signaling overheads can be further reduced, and at the same time an impact on another radio bearer can be reduced.

Figure 16:
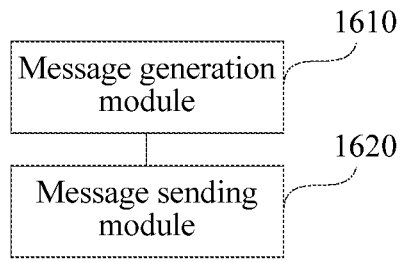
FIG. 16 is a structural block diagram of a radio bearer establishment apparatus according to another embodiment of the present disclosure.

Referring to FIG. 16, FIG. 16 is a structural block diagram of a radio bearer establishment apparatus provided in another embodiment of the present disclosure. The radio bearer establishment apparatus may be implemented as a part of the base station or the entire base station in the implementation environment shown in FIG. 1 by using software, hardware or a combination of software and hardware. The radio bearer establishment apparatus may include: a message generation module 1610 and a message sending module 1620.

The message generation module 1610 is configured to generate a configuration message, where the configuration message includes a first configuration parameter and a second configuration parameter, the first configuration parameter carries time-length information of a first status-report prohibition timer, and the second configuration parameter carries time-length information of a second status-report prohibition timer.

The message sending module 1620 is configured to send the configuration message to UE.

In conclusion, for the radio bearer establishment apparatus provided in this embodiment, a configuration message used to establish a radio bearer simultaneously carries time length information of two different status-report prohibition timers, so that UE applies prohibition time lengths corresponding to different status-report prohibition timers in different transmission environments, thereby improving an effect of data transmission.

In addition, a manner of sending a message used to reconfigure a radio bearer to UE does not need to be used to change a prohibition time length corresponding to a status-report prohibition timer, so that signaling overheads can be further reduced, and at the same time an interaction procedure between a base station and the UE is reduced.

In an optional embodiment provided based on the embodiment shown in FIG. 16, a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

It should be noted that when the radio bearer establishment apparatus provided in the foregoing embodiments establishes an RB, the foregoing division of functional modules is used as only an example for description. In an actual application, the foregoing functions may be allocated according to a requirement to be completed by different functional modules. That is, an internal structure of a device is divided into different functional modules, to complete all or some of the functions described above. In addition, the radio bearer establishment apparatus provided in the foregoing embodiments and the method embodiments of the radio bearer establishment method belong to a same concept. For a specific implementation process of the radio bearer establishment apparatus, refer to the method embodiments. Details are not described herein again.

Figure 17:
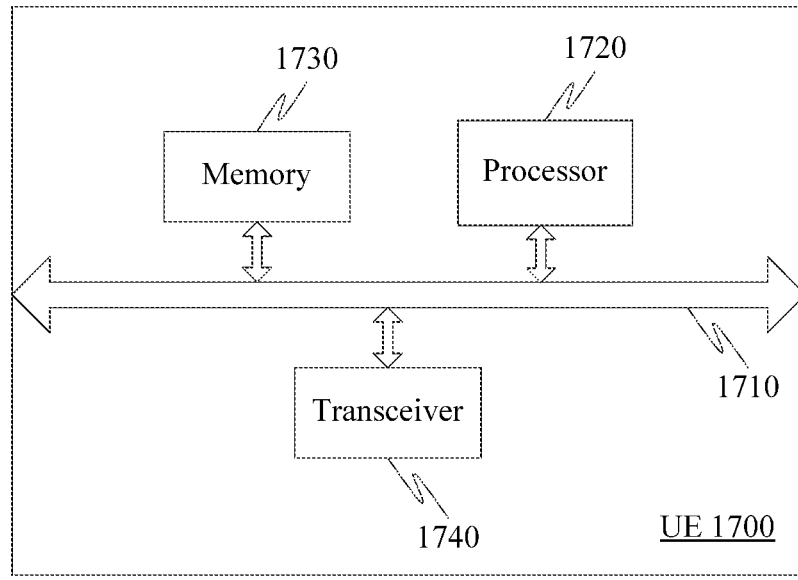
FIG. 17 is a structural block diagram of user equipment UE according to another embodiment of the present disclosure.

Referring to FIG. 17, FIG. 17 is a structural block diagram of user equipment UE provided in another embodiment of the present disclosure. As shown in FIG. 17, UE 1700 includes: a bus 1710 and a processor 1720, a memory 1730, and a transceiver 1740 that communicate by using the bus 1710. The memory 1730 is configured to store one or more instructions, and the instructions are configured to be executed by the processor 1720.

The processor 1720 is configured to control the transceiver 1740 to receive a configuration message sent by a base station, where the configuration message includes a first group of configuration parameters and a second group of configuration parameters that correspond to a radio bearer that needs to be established.

The processor 1720 is further configured to: determine, according to a preset rule, to apply a first group of configuration parameters and/or a second group of configuration parameters, and transmit signaling and/or data on an established radio bearer.

In conclusion, for the UE provided in this embodiment, a configuration message used to establish a radio bearer simultaneously carries two groups of different configuration parameters, so that the UE applies the different configuration parameters in different scenarios to improve an effect of data transmission, and a manner of sending a message used to reconfigure a radio bearer to the UE does not need to be used to complete reconfiguration. Therefore, signaling overheads can be further reduced, and at the same time an impact on another radio bearer can be reduced.

Figure 18:
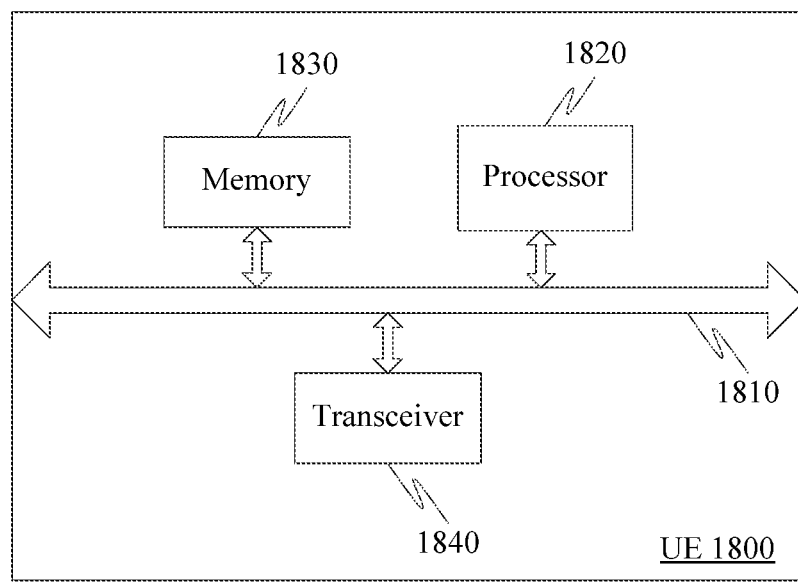
FIG. 18 is a structural block diagram of user equipment UE according to another embodiment of the present disclosure.

Referring to FIG. 18, FIG. 18 is a structural block diagram of user equipment UE provided in another embodiment of the present disclosure. As shown in FIG. 18, UE 1800 includes: a bus 1810 and a processor 1820, a memory 1830, and a transceiver 1840 that communicate by using the bus 1810. The memory 1830 is configured to store one or more instructions, and the instructions are configured to be executed by the processor 1820.

The processor 1820 is configured to control the transceiver 1840 to receive a configuration message sent by a base station, where the configuration message includes a first configuration parameter and a second configuration parameter, the first configuration parameter carries time-length information of a first status-report prohibition timer, and the second configuration parameter carries time-length information of a second status-report prohibition timer.

The processor 1820 is further configured to determine, according to a preset rule, to apply the first configuration parameter and/or the second configuration parameter to transmit a first status report or a second status report.

In conclusion, for the UE provided in this embodiment, a configuration message used to establish a radio bearer simultaneously carries time length information of two different status-report prohibition timers, so that the UE applies prohibition time lengths corresponding to different status-report prohibition timers in different transmission environments, thereby improving an effect of data transmission.

In addition, a manner of sending a message used to reconfigure a radio bearer to the UE does not need to be used to change a prohibition time length corresponding to a status-report prohibition timer, so that signaling overheads can be further reduced, and at the same time an interaction procedure between a base station and the UE is reduced.

In an optional embodiment provided based on the embodiment shown in FIG. 18, the first status report is used to indicate that the UE correctly receives a predefined data packet, and the second status report is used to indicate that at least one data packet of the redefined data packet is not correctly received; and a first prohibition time length is less than a second prohibition time length, where the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

In an optional embodiment provided based on the embodiment shown in FIG. 18, the processor 1820 is specifically configured to: determine that the first status-report prohibition timer is expired or is suspended, send the first status report to the base station, and set the first status-report prohibition timer to the first prohibition time length; or, the processor 1820 is specifically configured to: determine that the second status-report prohibition timer is expired or is suspended, send the second status report to the base station, and set the second status-report prohibition timer to the second prohibition time length.

In an optional embodiment provided based on the embodiment shown in FIG. 18, the processor 1820 is specifically configured to: determine that the first status-report prohibition timer is expired or is suspended, send the first status report to the base station, set the first status-report prohibition timer to the first prohibition time length, and set the second status-report prohibition timer to the second prohibition time length; or, the processor 1820 is specifically configured to: determine that the second status-report prohibition timer is expired or is suspended, send the second status report to the base station, set the second status-report prohibition timer to the second prohibition time length, and set the first status-report prohibition timer to the first prohibition time length.

In an optional embodiment provided based on the embodiment shown in FIG. 18, the processor 1820 is specifically configured to: determine that the first status-report prohibition timer is expired or is suspended, send the first status report to the base station, and set the first status-report prohibition timer to the first prohibition time length; or, the processor 1820 is specifically configured to: determine that the first status-report prohibition timer is expired or is suspended and that the second status-report prohibition timer is also expired or is suspended, send the second status report to the base station, set the first status-report prohibition timer to the first prohibition time length, and set the second status-report prohibition timer to the second prohibition time length.

In conclusion, when sending the first status report to the base station, the UE sets the first status-report prohibition timer to the first prohibition time length, that is, starts the status-report prohibition timer with a relatively small prohibition time length, so that a transmission rate of a data packet is increased in a case of relatively good transmission quality (that is, in a case in which a predefined data packet is correctly received). When sending the second status report to the base station, the UE sets the second status-report prohibition timer to the second prohibition time length, that is, starts the status-report prohibition timer with a relatively large prohibition time length, so that in a case of relatively poor transmission quality (that is, in a case in which at least one data packet of the predefined data packet is not correctly received), feedback of multiple second status reports to the base station is avoided, and the transmit end needs to retransmit, only one time, a data packet that fails to be sent, thereby saving radio transmission resources.

In another optional embodiment, when sending a status report, the UE further sets the first status-report prohibition timer to the first prohibition time length, and sets the second status-report prohibition timer to the second prohibition time length, that is, starts two status-report prohibition timers at the same time, thereby preventing a case in which a time interval between consecutive sending of two different types of status reports is not limited, so that a time interval between consecutive sending of any two status reports can be controlled.

In another optional embodiment, a time interval between two consecutive and sequential times of sending a first status report and a second status report is further shortened, thereby increasing a retransmission response speed of the base station.

Figure 19:
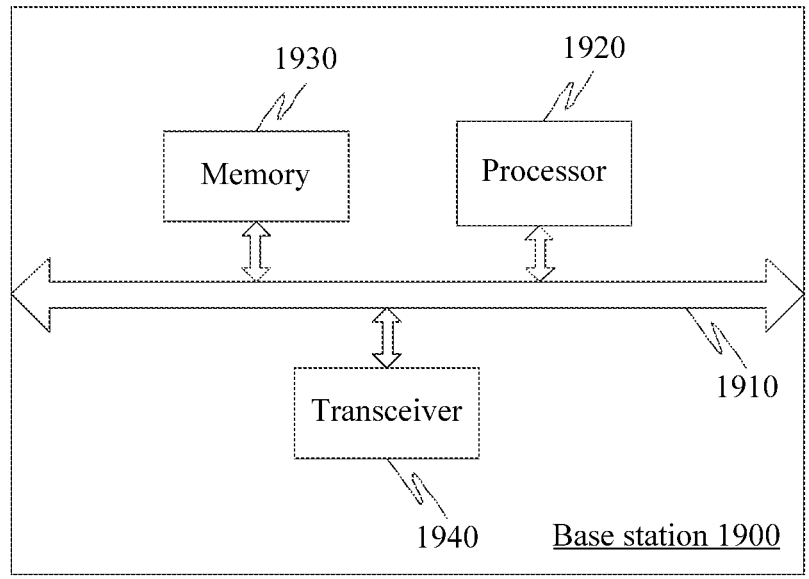
FIG. 19 is a structural block diagram of a base station according to another embodiment of the present disclosure.

Referring to FIG. 19, FIG. 19 is a structural block diagram of a base station provided in another embodiment of the present disclosure. As shown in FIG. 19, a base station 1900 includes: a bus 1910 and a processor 1920, a memory 1930, and a transceiver 1940 that communicate by using the bus 1910. The memory 1930 is configured to store one or more instructions, and the instructions are configured to be executed by the processor 1920.

The processor 1920 is configured to generate a configuration message, where the configuration message includes a first group of configuration parameters and a second group of configuration parameters that correspond to a radio bearer that needs to be established.

The processor 1920 is further configured to control the transceiver 1940 to send the configuration message to UE.

In conclusion, for the base station provided in this embodiment, a configuration message used to establish a radio bearer simultaneously carries two groups of different configuration parameters, so that UE applies the different configuration parameters in different scenarios to improve an effect of data transmission, and a manner of sending a message used to reconfigure a radio bearer to the UE does not need to be used to complete reconfiguration. Therefore, signaling overheads can be further reduced, and at the same time an impact on another radio bearer can be reduced.

Figure 20:
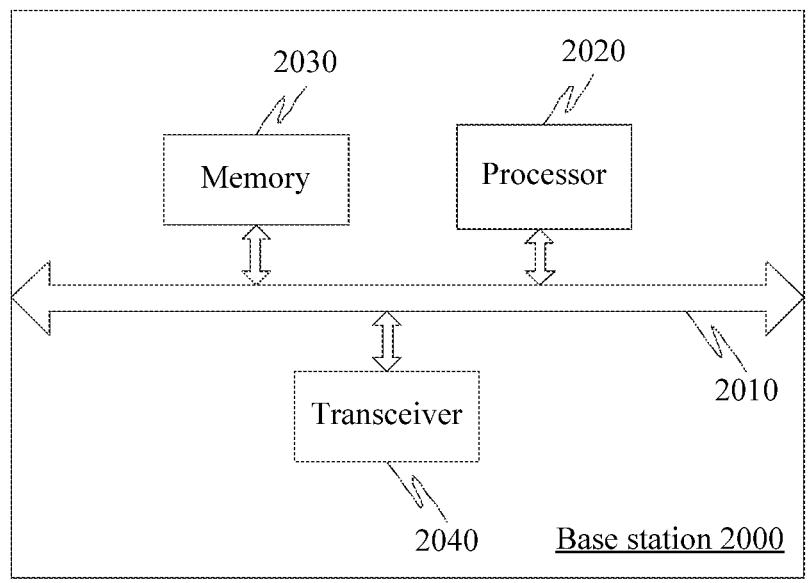
FIG. 20 is a structural block diagram of a base station according to another embodiment of the present disclosure.

Referring to FIG. 20, FIG. 20 is a structural block diagram of a base station provided in another embodiment of the present disclosure. As shown in FIG. 20, a base station 2000 includes: a bus 2010 and a processor 2020, a memory 2030, and a transceiver 2040 that communicate by using the bus 2010. The memory 2030 is configured to store one or more instructions, and the instructions are configured to be executed by the processor 2020.

The processor 2020 is configured to generate a configuration message, where the configuration message includes a first configuration parameter and a second configuration parameter, the first configuration parameter carries time-length information of a first status-report prohibition timer, and the second configuration parameter carries time-length information of a second status-report prohibition timer.

The processor 2020 is further configured to control the transceiver 2040 to send the configuration message to user equipment UE.

In conclusion, for the base station provided in this embodiment, a configuration message used to establish a radio bearer simultaneously carries time length information of two different status-report prohibition timers, so that UE applies prohibition time lengths corresponding to different status-report prohibition timers in different transmission environments, thereby improving an effect of data transmission.

In addition, a manner of sending a message used to reconfigure a radio bearer to UE does not need to be used to change a prohibition time length corresponding to a status-report prohibition timer, so that signaling overheads can be further reduced, and at the same time an interaction procedure between abase station and the UE is reduced.

In an optional embodiment provided based on the embodiment shown in FIG. 20, a first prohibition time length is less than a second prohibition time length, the first prohibition time length corresponds to a time length corresponding to the time-length information of the first status-report prohibition timer carried in the first configuration parameter, and the second prohibition time length corresponds to a time length corresponding to the time-length information of the second status-report prohibition timer carried in the second configuration parameter.

It should be understood that, unless the context clearly supports an exception, a single form "one" ("a", "an", "the") used herein also intends to include a plural form. It should be further understood that "and/or" used herein intends to include any and all possible combinations of one or more correlated items that are listed.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A radio bearer reconfiguration method, the radio bearer reconfiguration method comprising:
   receiving, by a user equipment (UE), a radio bearer reconfiguration indication sent by a base station, wherein the radio bearer reconfiguration indication comprises a radio bearer identifier and a target configuration parameter, the radio bearer identifier indicates a target radio bearer that needs to be reconfigured, the target configuration parameter corresponds to a configuration item of the target radio bearer that needs to be reconfigured, and the radio bearer reconfiguration indication does not include a second bearer identifier that indicates a second radio bearer currently established between the UE and the base station that does not need to be reconfigured;
   releasing, by the UE, the target radio bearer that needs to be reconfigured without releasing the second radio bearer; and
   transmitting, by the UE, at least one of signaling and data on a corresponding target radio bearer according to the target configuration parameter,
   wherein before releasing, by the UE, the target radio bearer that needs to be reconfigured, the method further comprises:
   reestablishing, by the UE, a protocol entity of the target radio bearer that needs to be reconfigured, to process a data packet that is temporarily not completely processed, wherein the protocol entity comprises at least one of a packet data convergence protocol (PDCP) layer entity and a radio link control (RLC) layer entity, and
   wherein reestablishing, by the UE, the protocol entity of the target radio bearer that needs to be reconfigured, to process the data packet that is temporarily not completely processed comprises:
     delivering, by the UE, using the PDCP layer entity of the target radio bearer that needs to be reconfigured, to an upper-layer entity of a PDCP layer, a data packet that meets a first predetermined condition, wherein the data packet that meets the first predetermined condition comprises a data packet that is temporarily not delivered to the upper-layer entity by the PDCP layer entity; and
     delivering, by the UE, using the RLC layer entity of the target radio bearer that needs to be reconfigured, to the PDCP layer entity, a data packet that meets a second predetermined condition, wherein the data packet that meets the second predetermined condition comprises a data packet that is temporarily not delivered to the PDCP layer entity by the RLC layer entity and that may be reassembled by the RLC layer entity.

2. The radio bearer reconfiguration method according to claim 1, wherein:
   the radio bearer reconfiguration indication further comprises a full configuration identifier; and
   releasing, by the UE, the target radio bearer that needs to be reconfigured comprises:
     releasing, by the UE, the target radio bearer that needs to be reconfigured according to the full configuration identifier.

3. The radio bearer reconfiguration method according to claim 1, wherein releasing, by the UE, the target radio bearer that needs to be reconfigured comprises:
   clearing, by the UE from an original configuration parameter corresponding to the target radio bearer that needs to be reconfigured by releasing a protocol entity of the target radio bearer that needs to be reconfigured, an original configuration parameter corresponding to the target configuration parameter;
   wherein the protocol entity comprises at least one of a packet data convergence protocol (PDCP) layer entity and a radio link control (RLC) layer entity.

4. The radio bearer reconfiguration method according to claim 3, wherein clearing, by the UE from the original configuration parameter corresponding to the target radio bearer that needs to be reconfigured by releasing the protocol entity of the target radio bearer that needs to be reconfigured, the original configuration parameter corresponding to the target configuration parameter comprises:
   when the target configuration parameter comprises configuration parameters of all items corresponding to the target radio bearer that needs to be reconfigured, clearing, by the UE, original configuration parameters of all the items corresponding to the target radio bearer that needs to be reconfigured.

5. The radio bearer reconfiguration method according to claim 3, wherein clearing, by the UE from the original configuration parameter corresponding to the target radio bearer that needs to be reconfigured by releasing the protocol entity of the target radio bearer that needs to be reconfigured, the original configuration parameter corresponding to the target configuration parameter comprises:

when the target configuration parameter comprises configuration parameters of some items corresponding to the target radio bearer that needs to be reconfigured, clearing, by the UE from the original configuration parameter corresponding to the target radio bearer that needs to be reconfigured, original configuration parameters of some items corresponding to the target configuration parameter, and reserving original configuration parameters of some other unchanged items.

6. The radio bearer reconfiguration method according to claim 1, wherein reestablishing, by the UE, the protocol entity of the target radio bearer that needs to be reconfigured, to process the data packet that is temporarily not completely processed comprises:

delivering, by the UE using the PDCP layer entity of the target radio bearer that needs to be reconfigured to an upper-layer entity of a PDCP layer, a data packet that meets a first predetermined condition, wherein the data packet that meets the first predetermined condition comprises a data packet that is temporarily not delivered to the upper-layer entity by the PDCP layer entity.

7. The radio bearer reconfiguration method according to claim 1, wherein reestablishing, by the UE, the protocol entity of the target radio bearer that needs to be reconfigured, to process the data packet that is temporarily not completely processed comprises:

delivering, by the UE using the RLC layer entity of the target radio bearer that needs to be reconfigured to the PDCP layer entity, a data packet that meets a second predetermined condition, wherein the data packet that meets the second predetermined condition comprises a data packet that is temporarily not delivered to the PDCP layer entity by the RLC layer entity and that may be reassembled by the RLC layer entity.

8. The radio bearer reconfiguration method according to claim 1, wherein reestablishing, by the UE, the protocol entity of the target radio bearer that needs to be reconfigured comprises: reestablishing, by the UE, the protocol entity of the target radio bearer that needs to be reconfigured according to a full configuration identifier in the radio bearer reconfiguration indication.

9. The radio bearer reconfiguration method according to claim 1, wherein: the radio bearer reconfiguration indication further comprises a reestablishment identifier; and reestablishing, by the UE, the protocol entity of the target radio bearer that needs to be reconfigured comprises: reestablishing, by the UE, the protocol entity of the target radio bearer that needs to be reconfigured according to the reestablishment identifier.

10. The radio bearer reconfiguration method according to claim 1, wherein transmitting, by the UE, at least one of signaling and data on the corresponding target radio bearer according to the target configuration parameter comprises:

when the target configuration parameter comprises configuration parameters of all items corresponding to the target radio bearer that needs to be reconfigured, transmitting, by the UE, at least one of signaling and data on the corresponding target radio bearer according to the target configuration parameter.

11. The radio bearer reconfiguration method according to claim 1, wherein transmitting, by the UE, at least one of signaling and data on the corresponding target radio bearer according to the target configuration parameter comprises:

when the target configuration parameter comprises configuration parameters of some items corresponding to the target radio bearer that needs to be reconfigured, transmitting, by the UE, at least one of signaling and data on the corresponding target radio bearer according to the target configuration parameter and original configuration parameters of some other unchanged items corresponding to the target radio bearer that needs to be reconfigured.

12. The radio bearer reconfiguration method according to claim 1, wherein the radio bearer reconfiguration indication comprises a radio resource control (RRC) connection reconfiguration message.

13. The radio bearer reconfiguration method according to claim 1, wherein the radio bearer reconfiguration indication comprises a control protocol data unit (PDU).

14. User equipment (UE), wherein the UE comprises:
a processor; and
memory coupled to the processor, the memory comprising instructions that, when executed by the processor, cause the UE to:
receive a radio bearer reconfiguration indication sent by a base station, wherein the radio bearer reconfiguration indication comprises a radio bearer identifier and a target configuration parameter, the radio bearer identifier indicates a target radio bearer that needs to be reconfigured, the target configuration parameter corresponds to a configuration item of the target radio bearer that needs to be reconfigured, and the radio bearer reconfiguration indication does not include a second bearer identifier that indicates a second radio bearer currently established between the UE and the base station that does not need to be reconfigured;
release the target radio bearer that needs to be reconfigured without releasing the second radio bearer; and
transmit at least one of signaling and data on a corresponding target radio bearer according to the target configuration parameter,
wherein the memory further comprises instructions that, when executed by the processor, cause the UE to:
before releasing the target radio bearer that needs to be reconfigured, reestablish a protocol entity of the target radio bearer that needs to be reconfigured, to process a data packet that is temporarily not completely processed, wherein the protocol entity comprises at least one of a packet data convergence protocol (PDCP) layer entity and a radio link control (RLC) entity; and
deliver, using the PDCP layer entity of the target radio bearer that needs to be reconfigured to an upper-layer entity of a PDCP layer, a data packet that meets a first predetermined condition, wherein the data packet that meets the first predetermined condition comprises a data packet that is temporarily not delivered to the upper-layer entity by the PDCP layer entity; and
deliver, using the RLC layer entity of the target radio bearer that needs to be reconfigured to the PDCP layer entity, a data packet that meets a second predetermined condition, wherein the data packet that meets the second predetermined condition comprises a data packet that is temporarily not delivered to the PDCP layer entity by the RLC layer entity and that may be reassembled by the RLC layer entity.

15. The UE according to claim 14, wherein:
the radio bearer reconfiguration indication further comprises a full configuration identifier; and the memory further comprises instructions that, when executed by the processor, cause the UE to release the target radio bearer that needs to be reconfigured according to the full configuration identifier.

16. The UE according to claim 14, wherein the memory further comprises instructions that, when executed by the processor, cause the UE to:
  clear, from an original configuration parameter corresponding to the target radio bearer that needs to be reconfigured by releasing a protocol entity of the target radio bearer that needs to be reconfigured, an original configuration parameter corresponding to the target configuration parameter;
  wherein the protocol entity comprises at least one of a packet data convergence protocol (PDCP) layer entity and a radio link control (RLC) layer entity.

17. The UE according to claim 16, wherein the memory further comprises instructions that, when executed by the processor, cause the UE to:
  when the target configuration parameter comprises configuration parameters of all items corresponding to the target radio bearer that needs to be reconfigured, clear, by the UE, original configuration parameters of all the items corresponding to the target radio bearer that needs to be reconfigured.

18. The UE according to claim 16, wherein the memory further comprises instructions that, when executed by the processor, cause the UE to:
  when the target configuration parameter comprises configuration parameters of some items corresponding to the target radio bearer that needs to be reconfigured, clear, by the UE from the original configuration parameter corresponding to the target radio bearer that needs to be reconfigured, original configuration parameters of some items corresponding to the target configuration parameter, and reserve original configuration parameters of some other unchanged items.

19. The UE according to claim 14, wherein the memory further comprises instructions that, when executed by the processor, cause the UE to:
  deliver, using the PDCP layer entity of the target radio bearer that needs to be reconfigured to an upper-layer entity of a PDCP layer, a data packet that meets a first predetermined condition, wherein the data packet that meets the first predetermined condition comprises a data packet that is temporarily not delivered to the upper-layer entity by the PDCP layer entity.

20. The UE according to claim 14, wherein the memory further comprises instructions that, when executed by the processor, cause the UE to:
  deliver, using the RLC layer entity of the target radio bearer that needs to be reconfigured to the PDCP layer entity, a data packet that meets a second predetermined condition, wherein the data packet that meets the second predetermined condition comprises a data packet that is temporarily not delivered to the PDCP layer entity by the RLC layer entity and that may be reassembled by the RLC layer entity.

21. The UE according to claim 14, wherein the memory further comprises instructions that, when executed by the processor, cause the UE to: reestablish the protocol entity of the target radio bearer that needs to be reconfigured according to a full configuration identifier in the radio bearer reconfiguration indication.

22. The UE according to claim 14, wherein: the radio bearer reconfiguration indication further comprises a reestablishment identifier; and the memory further comprises instructions that, when executed by the processor, cause the UE to: reestablish the protocol entity of the target radio bearer that needs to be reconfigured according to the reestablishment identifier.

23. The UE according to claim 14, wherein the memory further comprises instructions that, when executed by the processor, cause the UE to:
  when the target configuration parameter comprises configuration parameters of all items corresponding to the target radio bearer that needs to be reconfigured, transmit, at least one of signaling and or data on the corresponding target radio bearer according to the target configuration parameter.

24. The UE according to claim 14, wherein the memory further comprises instructions that, when executed by the processor, cause the UE to:
  when the target configuration parameter comprises configuration parameters of some items corresponding to the target radio bearer that needs to be reconfigured, transmit, by the UE, at least one of signaling and data on the corresponding target radio bearer according to the target configuration parameter and original configuration parameters of some other unchanged items corresponding to the target radio bearer that needs to be reconfigured.

25. The UE according to claim 14, wherein the radio bearer reconfiguration indication is a radio resource control (RRC) connection reconfiguration message.

26. The UE according to claim 14, wherein the radio bearer reconfiguration indication is a control protocol data unit (PDU).

* * * * *